United States Patent
Woo et al.

(10) Patent No.: US 9,767,053 B2
(45) Date of Patent: Sep. 19, 2017

(54) MEMORY CONTROLLER AND MEMORY SYSTEM INCLUDING THE SAME

(71) Applicants: Seonghoon Woo, Hwaseong-si (KR);
Haksun Kim, Suwon-si (KR);
Euihyeok Kwon, Hwaseong-si (KR);
Jaegeun Park, Seoul (KR)

(72) Inventors: Seonghoon Woo, Hwaseong-si (KR);
Haksun Kim, Suwon-si (KR);
Euihyeok Kwon, Hwaseong-si (KR);
Jaegeun Park, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 593 days.

(21) Appl. No.: 14/102,979

(22) Filed: Dec. 11, 2013

(65) Prior Publication Data
US 2014/0164673 A1    Jun. 12, 2014

(30) Foreign Application Priority Data
Dec. 11, 2012 (KR) .................. 10-2012-0143726

(51) Int. Cl.
*G06F 13/16* (2006.01)
(52) U.S. Cl.
CPC ...... *G06F 13/1673* (2013.01); *Y02B 60/1228* (2013.01)
(58) Field of Classification Search
CPC .................. G06F 13/1684; G06F 13/1673
See application file for complete search history.

(56) References Cited

U.S. PATENT DOCUMENTS

| 7,055,081 | B2 | 5/2006 | Boyer et al. |
| 7,721,118 | B1 * | 5/2010 | Tamasi ................. G06F 1/3203 345/502 |
| 7,823,044 | B2 | 10/2010 | Simon |
| 8,001,444 | B2 | 8/2011 | Vogan et al. |
| 8,250,403 | B2 | 8/2012 | Lee |
| 8,539,120 | B1 * | 9/2013 | Sha ........................ H04N 19/44 382/232 |
| 2002/0024701 | A1 * | 2/2002 | Ge ........................ H04L 49/201 398/101 |
| 2002/0129316 | A1 | 9/2002 | Boyer et al. |
| 2005/0125708 | A1 | 6/2005 | Simon |
| 2009/0044078 | A1 | 2/2009 | Vogan et al. |
| 2009/0055713 | A1 | 2/2009 | Hong et al. |
| 2009/0063934 | A1 | 3/2009 | Jo |
| 2009/0160867 | A1 * | 6/2009 | Grossman ............. G06T 15/005 345/522 |

(Continued)

FOREIGN PATENT DOCUMENTS

| DE | EP 1612672 A1 * | 1/2006 | ........... G06F 9/5066 |
| KR | 10-2009-0019593 A | 2/2009 | |

(Continued)

*Primary Examiner* — Farley Abad
(74) *Attorney, Agent, or Firm* — Harness, Dickey & Pierce P.L.C.

(57) ABSTRACT

A memory controller connected with a storage medium via a plurality of channels is provided which includes a signal processing block including a plurality of signal processing engines; and a decoding scheduler configured to control a data path such that at least one activated signal processing engine of the plurality of signal processing engines is connected with the plurality of channels, respectively.

27 Claims, 19 Drawing Sheets

(56) References Cited

U.S. PATENT DOCUMENTS

| | | | |
|---|---|---|---|
| 2009/0164704 A1* | 6/2009 | Kanade | G06F 11/1068 711/103 |
| 2009/0168522 A1 | 7/2009 | Shibata et al. | |
| 2010/0088574 A1 | 4/2010 | Kim et al. | |
| 2010/0229032 A1 | 9/2010 | Lee | |
| 2010/0332922 A1 | 12/2010 | Chang et al. | |
| 2011/0126079 A1 | 5/2011 | Wu et al. | |
| 2011/0153985 A1* | 6/2011 | Saha | G06F 21/602 712/42 |
| 2012/0051427 A1* | 3/2012 | Parfenov | H04N 19/159 375/240.13 |

FOREIGN PATENT DOCUMENTS

| | | |
|---|---|---|
| KR | 10-2009-0021743 A | 3/2009 |
| KR | 10-1030648 B1 | 4/2011 |

* cited by examiner

MEMORY CONTROLLER AND MEMORY SYSTEM INCLUDING THE SAME

CROSS-REFERENCE TO RELATED APPLICATIONS

A claim for priority under 35 U.S.C. §119 is made to Korean Patent Application No. 10-2012-0143726 filed Dec. 11, 2012, in the Korean Intellectual Property Office, the entire contents of which are incorporated herein by reference.

BACKGROUND

At least some embodiments of the inventive concepts described herein relate to a storage device. For example, at least some embodiments of the inventive concepts relate to a memory controller controlling a storage medium and/or a memory system including the same.

Semiconductor memories are usually considered to be one of the most vital microelectronic components of digital logic system design, such as computers and microprocessor-based applications ranging from satellites to consumer electronics. Therefore, advances in the fabrication of semiconductor memories including process enhancements and technology developments through the scaling for higher densities and faster speeds help establish performance standards for other digital logic families.

Semiconductor memory devices may be characterized as volatile random access memories (RAMs), or non-volatile memory devices. In RAMs, the logic information is stored either by setting up the logic state of a bistable flip-flop such as in a static random access memory (SRAM), or through the charging of a capacitor as in a dynamic random access memory (DRAM). In either case, the data are stored and can be read out as long as the power is applied, and are lost when the power is turned off; hence, they are called volatile memories.

Non-volatile memories, such as Mask Read-Only Memory (MROM), Programmable Read-Only Memory (PROM), Erasable Programmable Read-Only Memory (EPROM), and Electrically Erasable Programmable Read-Only Memory (EEPROM), are capable of storing the data, even with the power turned off. The non-volatile memory data storage mode may be permanent or reprogrammable, depending upon the fabrication technology used. Non-volatile memories are used for program and microcode storage in a wide variety of applications in the computer, avionics, telecommunications, and consumer electronics industries. A combination of single-chip volatile as well as non-volatile memory storage modes is also available in devices such as non-volatile SRAM (nvSRAM) for use in systems that require fast, programmable non-volatile memory. In addition, dozens of special memory architectures have evolved which contain some additional logic circuitry to optimize their performance for application-specific tasks.

In non-volatile memories, however, MROM, PROM, and EPROM are not free to be erased and written to by a system itself, so that it is not easy for general users to update stored contents. On the other hand, EEPROM is capable of being electrically erased or written. Application of the EEPROM is widened to an auxiliary memory or to system programming where continuous updates are needed (flash EEPROM).

SUMMARY

One aspect of at least one embodiment of the inventive concepts is directed to provide a memory controller which is connected with a storage medium via a plurality of channels. The memory controller comprises a signal processing block including a plurality of signal processing engines; and a decoding scheduler configured to control a data path such that at least one activated signal processing engines of the plurality of signal processing engines is connected with the plurality of channels, respectively.

In at least some example embodiments, the memory controller further comprises a CPU configured to determine an operating condition of the memory controller; and a register configured to store activation information of the plurality of signal processing engines decided according to a determination result of the CPU.

In at least some example embodiments, a part or all of the plurality of signal processing engines is activated by activation information stored at the register.

In at least some example embodiments, the memory controller further comprises a plurality of first in first out (FIFO)s configured to temporarily store data to be transferred to the plurality of channels; and an encoding scheduler configured to control a data path such that data in the plurality of FIFOs is transferred to the at least one activated signal processing engine.

In at least some example embodiments, the encoding scheduler comprises a first packet generator configured to generate packet data by adding control information to data output from each of the plurality of FIFOs based on a state of the at least one activated signal processing engine; and a first bus matrix configured to sequentially transfer packet data respectively corresponding to the plurality of FIFOs to the at least one activated signal processing engine based on the control information included in the packet data.

In at least some example embodiments, the decoding scheduler comprises a second packet generator configured to generate packet data by adding control information to data output from each of the plurality of channels based on a state of the at least one activated signal processing engine; and a second bus matrix configured to sequentially transfer packet data respectively corresponding to the plurality of channels to the at least one activated signal processing engine based on the control information included in the packet data.

In at least some example embodiments, if high performance is required, the CPU decides a value of the register such that the plurality of signal processing engines all is activated.

In at least some example embodiments, the encoding scheduler generates packet data such that data is distributed to the remaining signal processing engines of the activated signal processing engines other than a signal processing engine performing an encoding operation.

In at least some example embodiments, the decoding scheduler generates packet data such that data is distributed to the remaining signal processing engines of the activated signal processing engines other than a signal processing engine performing a decoding operation.

In at least some example embodiments, the decoding scheduler generates packet data such that data transferred via one of the plurality of channels is distributed to the activated signal processing engines.

In at least some example embodiments, the encoding scheduler generates packet data such that data transferred via one of the plurality of FIFOs is distributed to the activated signal processing engines.

In at least some example embodiments, the signal processing engines are error correction code engines, compression engines, encryption engines, or hash key engines.

In at least some example embodiments, the number of the plurality of signal processing engines is equal to or less than the number of the plurality of channels.

In at least some example embodiments, the plurality of signal processing engines operates according to the same error correction code algorithm.

Another aspect of at least one example embodiment of the inventive concepts is directed to provide a memory system comprising a storage medium; and a memory controller connected with the storage medium via a plurality of channels, wherein the memory controller includes a plurality of signal processing engines, and includes an encoding/decoding block connecting the plurality of signal processing engines to the plurality of channels respectively under a condition where the plurality of channels is used.

Still another aspect of at least one example embodiment of the inventive concepts is directed to provide a bandwidth controlling method of a memory controller which is connected with a storage medium via a plurality of channels. The bandwidth controlling method comprises receiving a signal to be processed; and processing the input signal, a signal processing level of the input signal being decided according to an operating condition of the memory controller.

In at least some example embodiments, processing of the input signal is performed by error correction code engines, compression engines, encryption engines, or hash key engines as signal processing engines.

In at least some example embodiments, the bandwidth controlling method further comprises controlling a data path such that at least one activated signal processing engine of the signal processing engines is connected to the plurality of channels, respectively.

In at least some example embodiments, the bandwidth controlling method further comprises controlling a data path such that the processed signal is transferred to the at least one activated signal processing engine.

In at least some example embodiments, the controlling a data path such that the processed signal is transferred to the at least one activated signal processing engine comprises generating packet data by adding control information to the processed signal based on a state of the at least one activated signal processing engine; and transferring the processed signal to the at least one activated signal processing engine based on the control information included in the packet data.

In at least some example embodiments, the controlling a data path such that the processed signal is transferred to the at least one activated signal processing engine comprises generating packet data by adding control information to data output from the plurality of channels based on a state of the at least one activated signal processing engine; and transferring signals corresponding to the plurality of channels to the at least one activated signal processing engine based on the control information included in the packet data.

In at least some example embodiments, a memory controller, which is connected with a storage medium via a plurality of channels, comprises a signal processing block including a plurality of coding engines, the plurality of coding engines being configured to perform a signal processing operation; and a scheduler configured to cause a first plurality of data units to be sent to a selected number of the plurality of coding engines, the memory controller being configured to determine the selected number based on an operation mode of the memory controller, the signal processing operation including one of a decoding operation and an encoding operation.

The scheduler may be configured such that, for a first operation mode of the memory controller, the scheduler determines a first number as the selected number, and for a second operation mode of the memory controller, the scheduler determines a second number as the selected number, the first number being different from second number.

The memory controller may be configured such that the first operation mode is a high-performance operation mode, the second operation mode is a peak power management operation mode, and the first number is higher than the second number.

BRIEF DESCRIPTION OF THE FIGURES

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1:
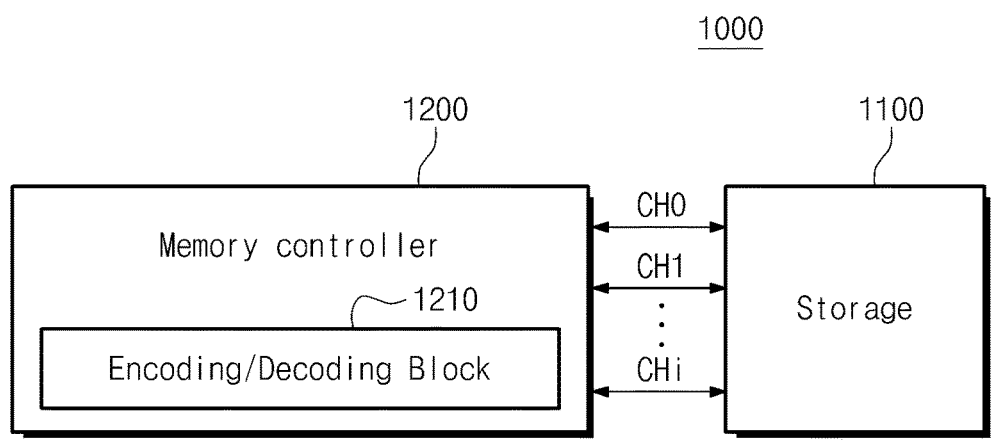
FIG. 1 is a block diagram schematically illustrating a memory system according to an embodiment of the inventive concepts.

Embodiments will be described in detail with reference to the accompanying drawings. Example embodiments of the inventive concepts, however, may be embodied in various different forms, and should not be construed as being limited only to the illustrated embodiments. Rather, these embodiments are provided as examples so that this disclosure will be thorough and complete, and will fully convey the concept of the inventive concepts to those skilled in the art. Accordingly, known processes, elements, and techniques are not described with respect to some of the embodiments of the inventive concepts. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concepts.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which the inventive concepts belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 is a block diagram schematically illustrating a memory system according to an embodiment of the inventive concepts.

Referring to FIG. 1, a memory system 1000 according to an embodiment of the inventive concepts may include storage medium 1100 and a memory controller 1200. The storage medium 1100 may be electrically connected with the memory controller 1200 via a plurality of channels CH0 to CHi. The storage medium 1100 may operate responsive to a control of the memory controller 1200. The storage medium 1100 may output data read requested by the memory controller 1200 or store data write requested by the memory controller 1200. The storage medium 1100 may be formed of a plurality of nonvolatile memory devices.

In at least some example embodiments, each nonvolatile memory device may be formed of a NAND flash memory device. The NAND flash memory device may be a NAND flash memory device having a two-dimensional array structure or a NAND flash memory device having a three-dimensional array structure. The NAND flash memory device having a three-dimensional array structure may be referred to as a vertical NAND flash memory device.

In at least some example embodiments, the storage medium 1100 may be formed of a nonvolatile memory device such as a NOR flash memory device, a Resistive Random Access Memory (RRAM) device, a Phase-Change Memory (PRAM) device, a Magnetroresistive Random Access Memory (MRAM) device, a Ferroelectric Random Access Memory (FRAM) device, a Spin Transfer Torque Random Access Memory (STT-RAM), and the like. Further, according to an example embodiment of the inventive concepts, a Charge Trap Flash (CTF) memory device including a charge storage layer formed of an insulation film and a flash memory device including a charge storage layer formed of a conductive floating gate may be used in the storage medium 1100.

The memory controller 1200 may control the storage medium 1100 in response to a request of a host. Also, when background operations such as a garbage collection operation, a merge operation, and so on are required, the memory controller 1200 may control the storage medium 1100 according to the required background operations without intervention of the host. The memory controller 1200 may send data to the storage medium 1100 via the plurality of channels CH0 to CHi. The memory controller 1200 may receive data from the storage medium 1100 via the plurality of channels CH0 to CHi. The memory controller 1200 may be configured to encode data write requested by the host and to transfer the encoded data to the storage medium 110. The memory controller 1200 may be configured to decode read-requested data input from the storage medium 1100.

The memory controller 1200 may include an encoding/decoding block 1210 for data encoding and decoding. The encoding/decoding block 1210 may generate encoding data by generating an error correction code (ECC) based on program data to be stored at the storage medium 1100 and adding the ECC to the program data. The encoding data may be sent to the storage medium 1100 via the plurality of channels CH0 to CHi. The encoding/decoding block 1210 may be configured to detect an error of read-out data output from the storage medium 1100 and to correct the detected error of the read-out data. The error of the read-out data may be detected based on ECC included in the read-out data.

The encoding/decoding block 1210 may include a plurality of ECC engines, which are selectively activated in view of operating conditions (e.g., low-power, high-performance, peak power, etc.). Data to be decoded and encoded may be randomly distributed to activated ECC engines based on states (including a ready state and a busy state) of the activated ECC engines. For example, the distribution of the data may be adaptive to states of the activated ECC engines. In other words, data may be encoded and decoded by a selected ECC engine according to states of ECC engines, not encoded/decoded under the condition that ECC engines are fixed to channels CH0 to CHi, respectively. An encoding/decoding manner according to at least one embodiment of the inventive concepts may enable tuning of power and performance of the memory system 1000. Also, the encoding/decoding manner according to at least one embodiment of the inventive concepts may enable the error correction efficiency to be improved.

It is well understood that at least some embodiments of the inventive concepts are not limited to an example where the encoding/decoding block 1210 includes ECC engines. For example, the encoding/decoding block 1210 may be formed of engines for encryption, compression, or generating of a hash key. In this case, engines for encryption, compression, or generating of a hash key may be selectively activated in view of operating conditions (e.g., low-power, high-performance, peak power, etc.). Also, data to be decoded and encoded may be randomly distributed to activated engines based on states (including a ready state and a busy state) of the activated engines. For example, the distribution of the data may be adaptive to states of the activated engines. In other words, data may be encoded and decoded by a selected engine according to states of engines for encryption, compression, or generating of a hash key, not encoded/decoded under the condition that engines for encryption, compression, or generating of a hash key are fixed to channels CH0 to CHi, respectively. An encoding/decoding manner according to at least one embodiment of the inventive concepts may enable tuning of power and performance of the memory system 1000. Also, the encoding/decoding manner according to at least one embodiment of the inventive concepts may enable the encoding/decoding efficiency to be improved.

Figure 2:
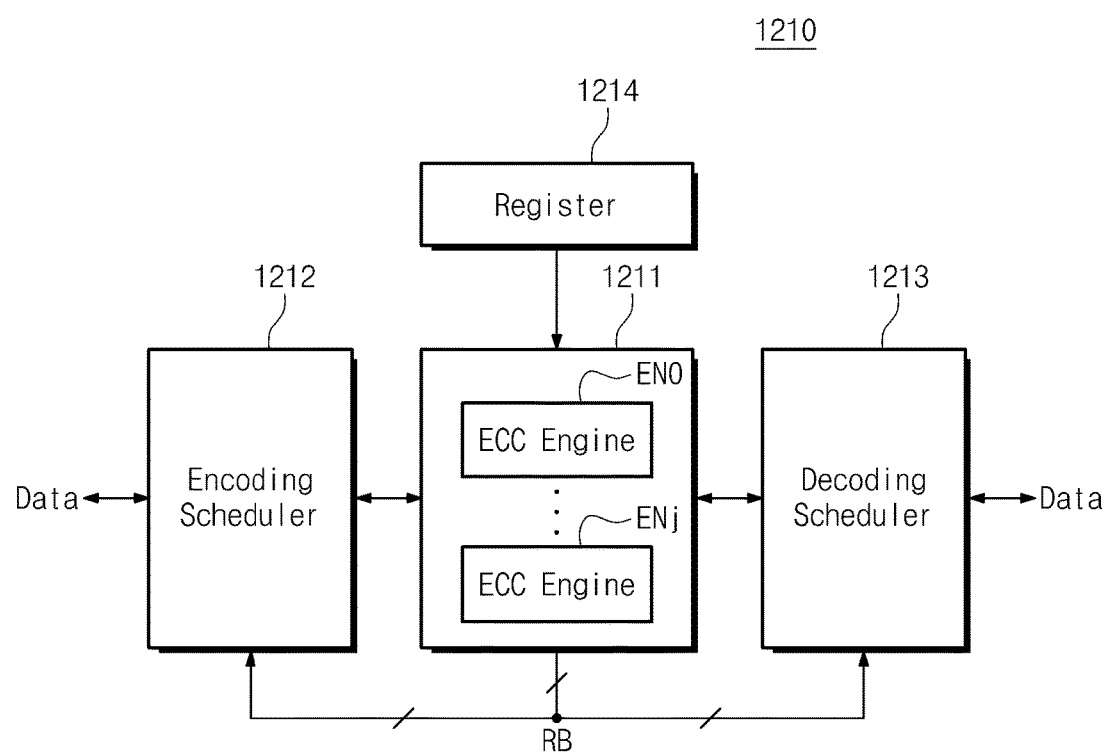
FIG. 2 is a block diagram schematically illustrating an encoding/decoding block illustrated in FIG. 1.

FIG. 2 is a block diagram schematically illustrating an encoding/decoding block illustrated in FIG. 1.

Referring to FIG. 2, an encoding/decoding block 1210 may include an ECC block 1211 as a signal processing block, an encoding scheduler 1212, a decoding scheduler 1213, and a register 1214. The ECC block 1211 may include a plurality of ECC engines EN0 to ENj as signal processing engines. The number of ECC engines EN0 to ENj may be more or less than the number of channels CH0 to CHi or the same as the number of channels CH0 to CHi. The ECC engines EN0 to ENj may perform error detecting and correcting operations according to the same ECC algorithm. Alternatively, one or more (for example, half) of the ECC engines EN0 to ENj may perform error detecting and correcting operations according to a first ECC algorithm, and the rest may perform error detecting and correcting operations according to one or more other ECC algorithms different from the first ECC algorithm. For ease of description, it is assumed that the ECC engines EN0 to ENj perform error detecting and correcting operations according to the same ECC algorithm. However, at least some embodiments of the inventive concepts are not limited thereto.

Activation and inactivation of the ECC engines EN0 to ENj may be decided according to a value stored at the register 1214. As described later, a value of the register 1214 may be decided in view of operating conditions of a memory controller 1100. A part or all of the ECC engines EN0 to ENj may be activated according to a value stored at the register 1214. For example, when high performance is required, a value of the register 1214 may be decided such that all of the ECC engines EN0 to ENj are activated. When low power is required or management of peak power is required, a value of the register 1214 may be decided such that one or more, but not all, of the ECC engines EN0 to ENj are activated.

The encoding scheduler 1212 may receive data to be encoded, select one or more ECC engines of ECC engines having a ready state in view of states of activated ECC engines of the ECC block 1210, and provide data to be encoded to the selected one or more ECC engines. The decoding scheduler 1213 may receive data to be decoded, select one or more ECC engines of ECC engines having a ready state in view of states of activated ECC engines of the ECC block 1210, and provide data to be decoded to the selected one or more ECC engines. The ECC engines EN0 to ENj may be connected to channels CH0 to CHi via the decoding scheduler 1213. One ECC engine may be configured to decode data transferred from a part or all of the channels CH0 to CHi and to encode data to be transferred to a part or all of the channels CH0 to CHi. In other words, data transferred via one channel may be decoded via one or more ECC engines of activated ECC engines. Likewise, data to be sent to storage medium 1100 may be encoded via one or more ECC engines of activated ECC engines.

With the encoding/decoding block 1210 according to at least one example embodiment of the inventive concepts, the number of ECC engines participating in decoding and encoding may be adjusted in real time or in advance according to operating conditions. Also, encoding/decoding of data may be performed by a selected ECC engine(s) (having a ready state) in view of states of activated ECC engines.

That the number of ECC engines participating in decoding and encoding is adjusted according to operating conditions may mean that a bandwidth (or, a data transfer rate, a bit rate, or a throughput) of the encoding/decoding block 1210 is variable. It may be necessary to maintain a temperature or power consumption of a memory system 1000 constantly. The temperature or power consumption may be constantly maintained by adjusting the bandwidth. For example, in the case that the temperature or power consumption is low, it is possible to increase the bandwidth. Alternatively, in the case that the temperature or power consumption increases, an increase in the temperature or power consumption may be suppressed by reducing the bandwidth. Thus, it is possible to maintain the temperature or power consumption of the memory system 1000 constantly by controlling the bandwidth of the encoding/decoding block 1210.

Figure 3:
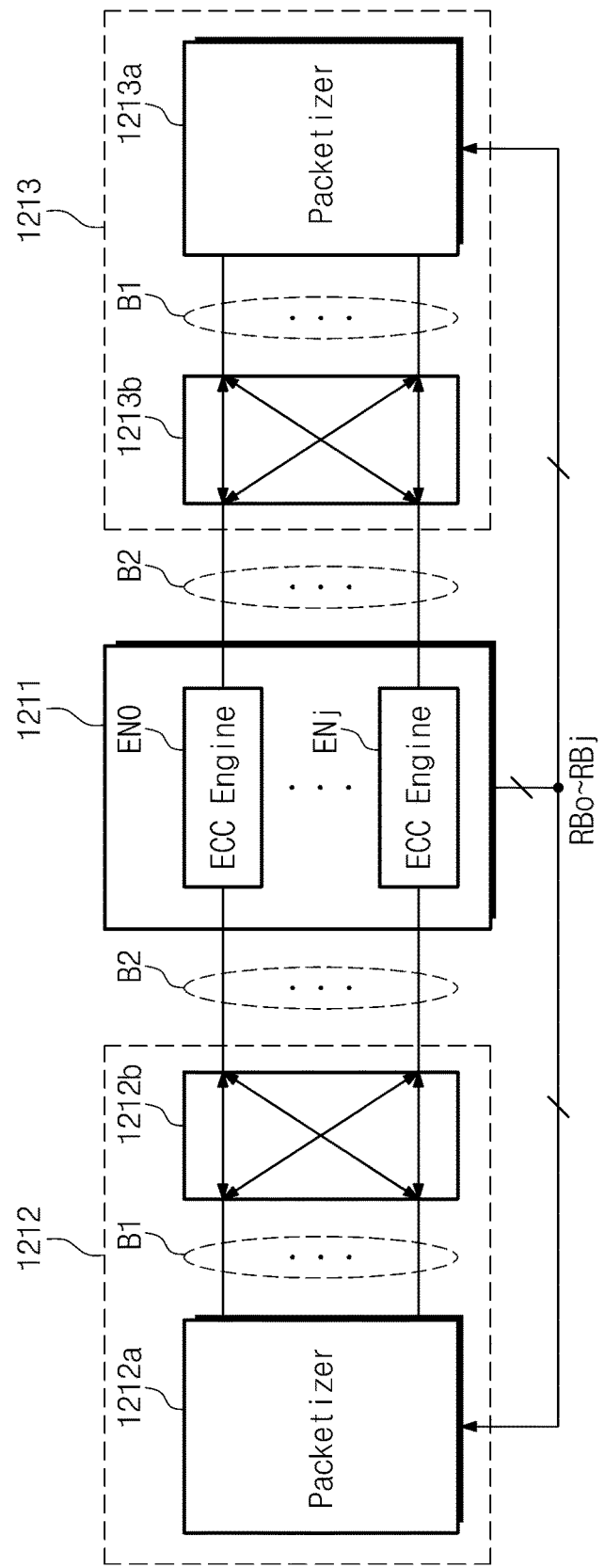
FIG. 3 is a block diagram schematically illustrating an encoding scheduler and a decoding scheduler illustrated in FIG. 2.

FIG. 3 is a block diagram schematically illustrating an encoding scheduler and a decoding scheduler illustrated in FIG. 2.

Referring to FIG. 3, an encoding scheduler 1212 may include a first packetizer 1212a and a first bus matrix 1212b. The first packetizer 1212a may generate packet data by adding control information to input data. For example, the first packetizer 1212a may be configured to add control information to the input data based on state signals RB0 to RBj of ECC engines (or, signal processing engines) EN0 to ENj. Herein, the control information may include data (hereinafter, referred to as engine selection information) appointing an ECC engine having a ready state. The control information may include data (hereinafter, referred to as destination information) appointing destination of the input data. Data appointing destination of the input data can be provided together with the input data. As a connection matrix, the first bus matrix 1212b may transfer packet data output from the first packetizer 1212a to one of ECC engines. That is, the first bus matrix 1212b may provide the packet data to an ECC engine corresponding to control information (i.e., engine selection information included in the control information) included in the packet data.

In at least some example embodiments, the number of bus lines B1 connecting the first packetizer 1212a and the first bus matrix 1212b and the number of bus lines B2 connecting the first bus matrix 1212b and an ECC block 1211 may be identical to or different from each other. A bus line B1 connected with the first packetizer 1212a may be connected with one of the bus lines B2 according to the control information. This may be made by disposing a switching means (e.g., formed of a decoder and switches) at a connection node of the bus line B1 and the bus lines B2.

Continuing to refer to FIG. 3, a decoding scheduler 1213 may include a second packetizer 1213a and a second bus matrix 1213b. The second packetizer 1213a may generate packet data by adding control information to input data. For example, the second packetizer 1213a may be configured to add control information to the input data based on state signals RB0 to RBj of the ECC engines EN0 to ENj. Herein, the control information may include engine selection information appointing an ECC engine having a ready state. The control information may include destination information appointing destination of the input data. Data appointing destination of the input data can be provided together with the input data. As a connection matrix, the second bus matrix 1213b may transfer packet data output from the second packetizer 1213a to one of ECC engines. That is, the second bus matrix 1213b may provide the packet data to an ECC engine corresponding to control information (i.e., engine selection information included in the control information) included in the packet data.

In at least some example embodiments, the number of bus lines B1 connecting the second packetizer 1213a and the second bus matrix 1213b and the number of bus lines B2 connecting the second bus matrix 1213b and the ECC block 1211 may be identical to or different from each other. A bus line B1 connected with the second packetizer 1213a may be connected with one of the bus lines B2 according to the control information. This may be made by disposing a switching means (e.g., formed of a decoder and switches) at a connection node of the bus line B1 and the bus lines B2.

As illustrated in FIG. 3, the error correction efficiency may be improved by distributing packet data using state signals of ECC engines indicating a ready state or a busy state. That is, in the case that one ECC engine is at a busy state for decoding, another ECC engine may perform decoding on next data in parallel with the ECC engine existing at the busy state, so that the performance of a random read operation is improved.

Figure 4:
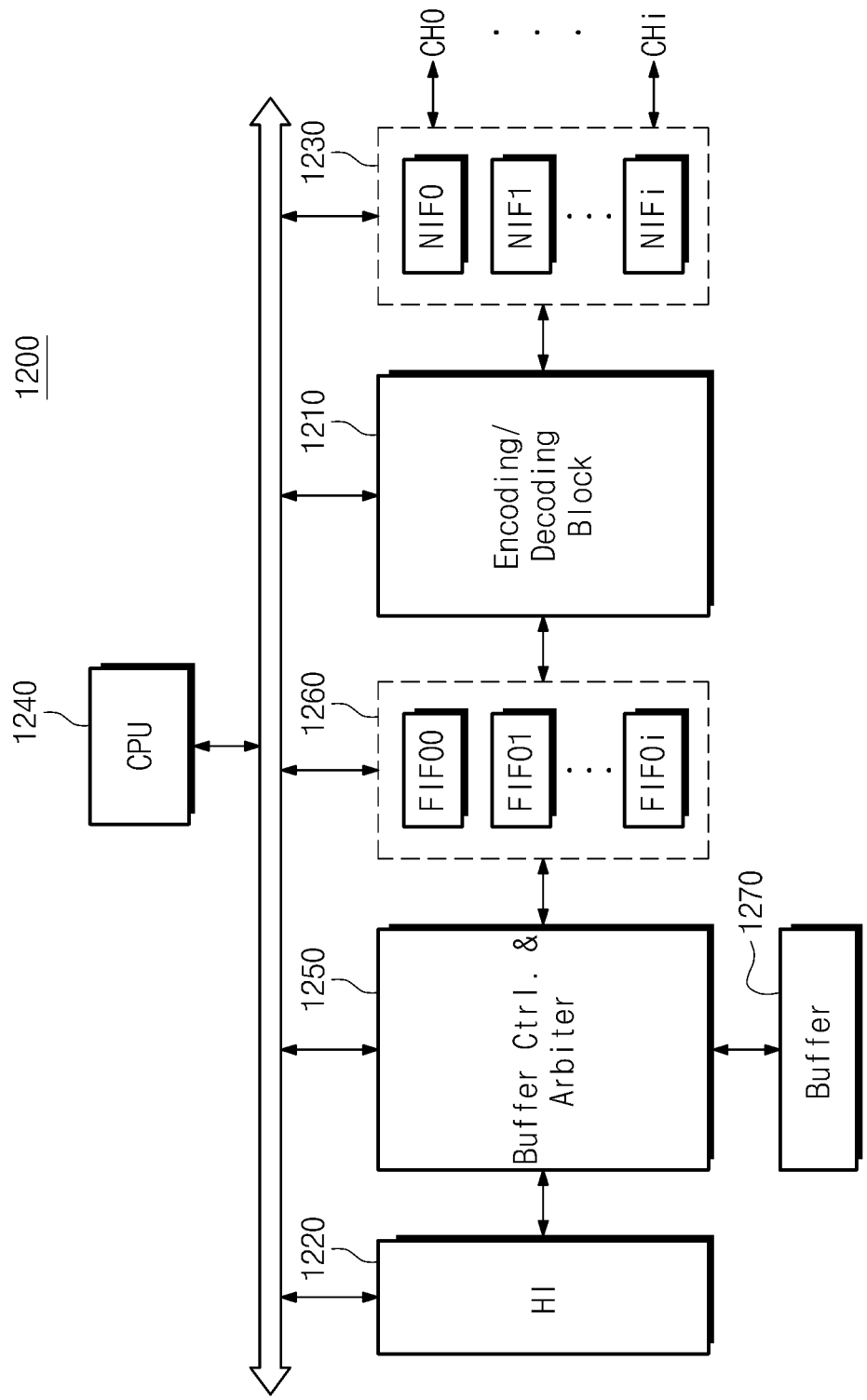
FIG. 4 is a block diagram schematically illustrating a memory controller according to an embodiment of the inventive concepts.

FIG. 4 is a block diagram schematically illustrating a memory controller according to an embodiment of the inventive concepts.

Referring to FIG. 4, a memory controller 1200 may include an encoding/decoding block 1210, a host interface 1220 as a first interface, a memory interface 1230 as a second interface, a CPU 1240, a buffer controller and arbiter block 1250, a first in first out (FIFO) block 1260, and a buffer memory 1270.

The encoding/decoding block 1210 may be configured to encode data to be stored at storage medium 1100 and to decode data output from the storage medium 1100. As described with reference to FIGS. 2 and 3, the encoding/decoding block 1210 may include a plurality of ECC engines EN0 to ENj. The ECC engines EN0 to ENj may be selectively activated according to operating conditions (e.g., low-power, high-performance, peak power, etc.). For example, all or a part of the ECC engines EN0 to ENj may be activated according to the operating conditions. As described above, each of the activated ECC engines may process data provided from all or a part of channels CH0 to CHi or to be provided to all or a part of the channels CH0 to CHi.

The host interface 1220 may be configured to interface with an external device (e.g., a host). The memory interface 1230 may be configured to interface with storage medium 1100 in FIG. 1 via the channels CH0 to CHi. The memory interface 1230 may include NAND interface units NIF0 to NIFi corresponding to the channels CH0 to CHi, respectively. The NAND interface units NIF0 to NIFi may be configured to interface with nonvolatile memory devices connected with corresponding channels under the control of the CPU 1240. The CPU 1240 may be configured to control an overall operation of the memory controller 1200. For example, the CPU 1240 may be configured to operate firmware such as a flash translation layer (FTL). As described above, the CPU 1240 may set a register 1214 of the encoding/decoding block 1210 in view of operating conditions.

The FIFO block 1260 may include FIFOs FIFO0 to FIFOi corresponding to the channels CH0 to CHi, respectively. As used herein, the term FIFO refers to a queue, buffer, and/or circuit which stores data in accordance with a 'first in, first out' scheme. The FIFO block 1260 may transfer data output from the buffer memory 1270 via the buffer controller and arbiter block 1250 to the encoding/decoding block 1210.

The FIFO block 1260 may transfer data output from the encoding/decoding block 1210 to the buffer memory 1270 via the buffer controller and arbiter block 1250. The buffer memory 1270 may be used to temporarily store data to be transferred to the external device via the host interface 1220 under the control of the buffer controller and arbiter block 1250. The buffer memory 1270 may be used to temporarily store data to be transferred to the storage medium 1100 via the memory interface 1230 under the control of the buffer controller and arbiter block 1250. The buffer memory 1270 may be used to store information (e.g., mapping information) needed to control the storage medium 1100.

Although not illustrated in figures, the memory controller 1200 may further include a randomizer/de-randomizer which is configured to randomize data to be stored in the storage medium 1100 and to de-randomize data read from the storage medium 1100. An example of the randomizer/de-randomizer is disclosed in U.S. Patent Publication No. 2010/0088574, the entirety of which is incorporated by reference herein.

In at least some example embodiments, the host interface 1220 may be formed of one of computer bus standards, storage bus standards, and iFCPPeripheral bus standards, or a combination of two or more standards. The computer bus standards may include S-100 bus, Mbus, Smbus, Q-Bus, ISA, Zorro II, Zorro III, CAMAC, FASTBUS, LPC, EISA, VME, VXI, NuBus, TURBOchannel, MCA, Sbus, VLB, PCI, PXI, HP GSC bus, CoreConnect, InfiniBand, UPA, PCI-X, AGP, PCIe, Intel QuickPath Interconnect, Hyper Transport, and the like. The storage bus standards may include ST-506, ESDI, SMD, Parallel ATA, DMA, SSA, HIPPI, USB MSC, FireWire (1394), Serial ATA, eSATA, SCSI, Parallel SCSI, Serial Attached SCSI, Fibre Channel, iSCSI, SAS, RapidIO, FCIP, etc. The iFCPPeripheral bus standards may include Apple Desktop Bus, HIL, MIDI, Multibus, RS-232, DMX512-A, EIA/RS-422, IEEE-1284, UNI/O, 1-Wire, I2C, SPI, EIA/RS-485, USB, Camera Link, External PCIe, Light Peak, Multidrop Bus, and the like.

Figure 5:
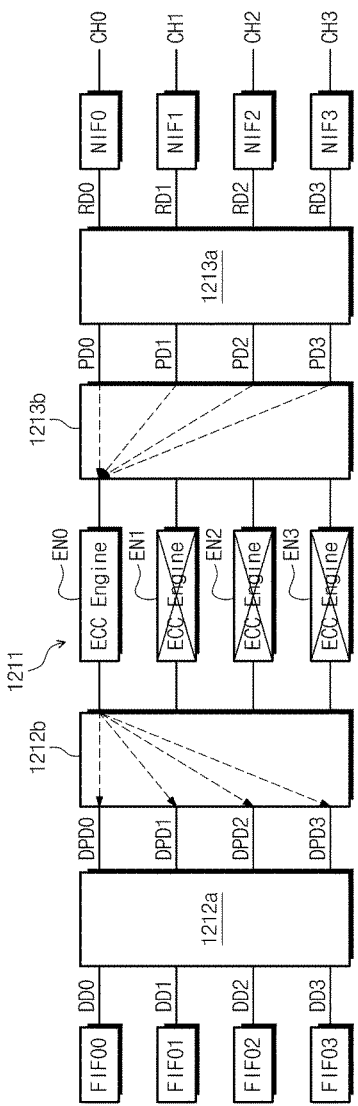
FIG. 5 is a diagram illustrating a decoding operation when a memory system according to an embodiment of the inventive concepts operates at a low-power mode.

FIG. 5 is a diagram illustrating a decoding operation when a memory system according to an embodiment of the inventive concepts operates at a low-power mode.

For ease of description, it is assumed that a memory controller 1200 is connected with storage medium 1100 via four channels CH0 to CH3. Also, it is assumed that an ECC block 1211 is formed of four ECC engines EN0 to EN3. However, the number of ECC engines included in the ECC block 1211 may not be limited thereto. For example, the number of ECC engines included in the ECC block 1211 may be more than the number of channels. Alternatively, the number of ECC engines included in the ECC block 1211 may be less than the number of channels.

A low-power operation or high performance may be required according to an application program/application field. In the case that the application program/application field requires a low-power operation, a CPU 1240 of the memory controller 1200 may control an encoding/decoding block 1210 such that only a part, and not all, of the ECC engines EN0 to EN3 of the ECC block 1211 is activated. For example, the CPU 1240 of the memory controller 1200 may decide a value of a register 1214 of the encoding/decoding block 1210 such that one engine, EN0, of the ECC engines EN0 to EN3 of the ECC block 1211 is activated. As a value of the register 1214 is decided, the ECC engine EN0 may be activated, while the remaining ECC engines EN1 to EN3 may not be activated.

Under the above condition, data RD0 to RD3 transferred via the channels CH0 to CH3 may be transferred to a packetizer 1213*a* via NAND interface units NIF0 to NIF3. The data RD0 to RD3 may be provided from the storage medium 1100 as data read requested by a host. The packetizer 1213*a* may generate packet data PD0 to PD3 by adding control information to the data RD0 to RD3 input via the channels CH0 to CH3 based on a state of the activated ECC engine EN0. Herein, the control information may include destination information appointing a FIFO to which data is to be transferred and engine selection information indicating an ECC engine to which packet data is to be transferred. Since one ECC engine EN0 is activated, the engine selection information may be set to a value indicating the ECC engine EN0.

A bus matrix 1213*b* may transfer the packet data PD0 to PD3 sequentially transferred from the packetizer 1213*a* to the activated ECC engine EN0, based on control information included in each of the packet data PD0 to PD3. A bus matrix 1212*b* may transfer packet data DPD0 to DPD3 decoded by the ECC engine EN0 to a packetizer 1212*a*, based on control information (i.e., destination information) included in each of the decoded packet data DPD0 to DPD3. The packetizer 1212*a* may remove control information included in the decoded packet data DPD0 to DPD3 transferred via the bus matrix 1212*b* to transfer decoded data DD0 to DD3 to FIFOs FIFO0 to FIFO3, respectively. The decoded data DD0 to DD3 transferred to the FIFOs FIFO0 to FIFO3 may be stored at a buffer memory 1270 via a buffer controller and arbiter block 1250.

As understood from the above description, when a low-power operation is required, a power consumed by the ECC block 1211 may be reduced by activating a part of ECC engines (e.g., one or more ECC engines) under the condition that all channels CH0 to CH3 are used.

In at least some example embodiments, setup of the register 1214 for a low-power operation may be performed in real time or in advance under the control of the CPU 1240.

Figure 6:
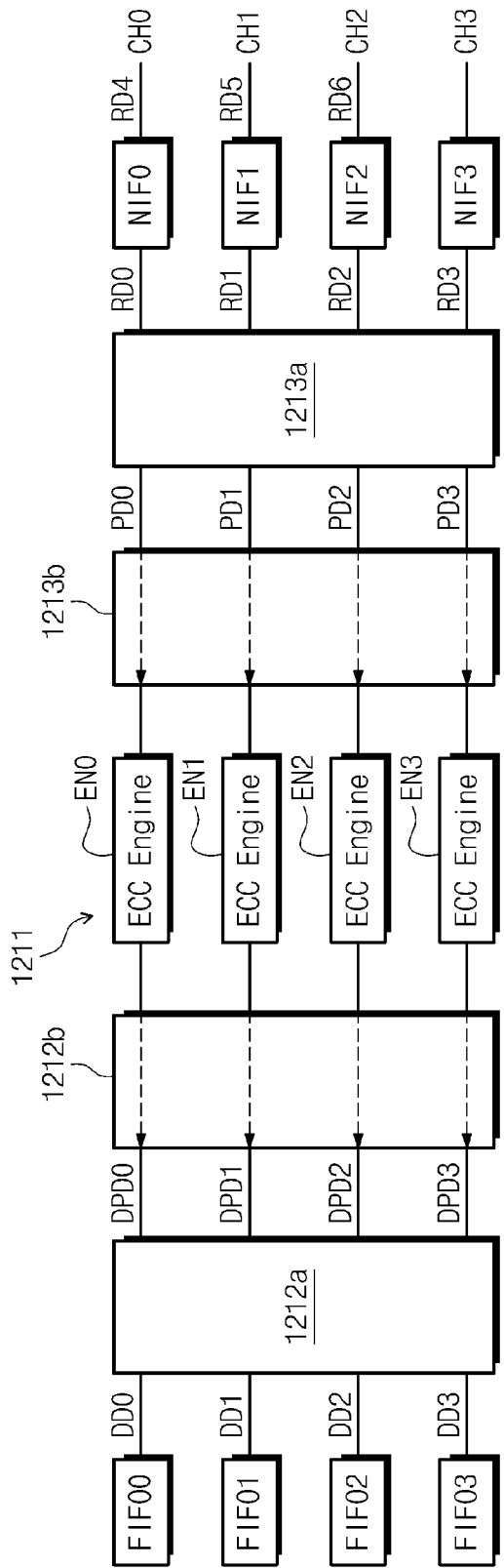
FIG. 6 is a diagram illustrating a decoding operation when a memory system according to an embodiment of the inventive concepts operates at a high-performance mode.

FIG. 6 is a diagram illustrating a decoding operation when a memory system according to an embodiment of the inventive concepts operates at a high-performance mode.

For ease of description, it is assumed that a memory controller 1200 is connected with storage medium 1100 via four channels CH0 to CH3. Also, it is assumed that an ECC block 1211 is formed of four ECC engines EN0 to EN3. However, the number of ECC engines included in the ECC block 1211 may not be limited thereto. For example, the number of ECC engines included in the ECC block 1211 may be more than the number of channels. Alternatively, the number of ECC engines included in the ECC block 1211 may be less than the number of channels.

A low-power operation or high performance may be required according to an application program/application field. In the case that the application program/application field requires a high-performance operation, a CPU 1240 of the memory controller 1200 may control an encoding/decoding block 1210 such that all of the ECC engines EN0 to EN3 of the ECC block 1211 are activated. For example, the CPU 1240 of the memory controller 1200 may decide a value of a register 1214 of the encoding/decoding block 1210 such that all of the ECC engines EN0 to EN3 of the ECC block 1211 are activated. As a value of the register 1214 is decided, the ECC engines EN0 to EN3 may be activated.

Under the above condition, data RD0 to RD3 transferred via the channels CH0 to CH3 may be transferred to a packetizer 1213*a* via NAND interface units NIF0 to NIF3. The packetizer 1213*a* may generate packet data PD0 to PD3 by adding control information to the data RD0 to RD3 input via the channels CH0 to CH3 based on states of the activated ECC engines EN0 to EN3. As described above, the control information may include destination information appointing a FIFO to which data is to be transferred and engine selection information indicating an ECC engine to which packet data is to be transferred.

As illustrated in FIG. 6, a bus matrix 1213b may transfer the packet data PD0 to PD3 transferred from the packetizer 1213a to corresponding ECC engines EN0 to EN3, based on control information included in the packet data PD0 to PD3. A bus matrix 1212b may transfer packet data DPD0 to DPD3 respectively decoded by the ECC engines EN0 to EN3 to a packetizer 1212a, based on control information (i.e., destination information) included in the decoded packet data DPD0 to DPD3. The packetizer 1212a may remove control information included in the decoded packet data DPD0 to DPD3 transferred via the bus matrix 1212b to transfer decoded data DD0 to DD3 to FIFOs FIFO0 to FIFO3, respectively. The decoded data DD0 to DD3 transferred to the FIFOs FIFO0 to FIFO3 may be stored at a buffer memory 1270 via a buffer controller and arbiter block 1250.

As understood from the above description, when a high-performance operation is required, data read requested by a host may be rapidly processed by activating all ECC engines under the condition that all channels CH0 to CH3 are used.

As illustrated in FIG. 6, it is assumed that data RD4 to RD6 are successively transferred following the data RD0 to RD3 via the channels CH0 to CH2. There may arise the case that decoding operations of packet data PD1 to PD3 executed by the ECC engines EN1 to EN3 are completed and a decoding operation of packet data PD0 executed by the ECC engine EN0 is not completed. In this case, the data RD4 to RD6 transferred via the channels CH0 to CH2 may be distributed to activated ECC engines EN1 to EN3 having a ready state via the packetizer 1213b. In other words, in the case that data is continuously transferred via a specific channel of channels CH0 to CHi, data transferred via the specific channel may be distributed to an ECC engine(s) having a ready state for decoding. Data transferred via a specific channel is not limited to being decoded by one ECC engine that corresponds to the specific channel. This manner may be applied to a random read operation which is performed by a 4 KB unit, for example. The 4 KB data may be distributed to the ECC engines EN0 to EN3 via the decoding scheduler 1212 by a 1 KB unit. The performance of a random read operation may be performed by distributing a decoding operation of data focused at a specific channel.

Figure 7:
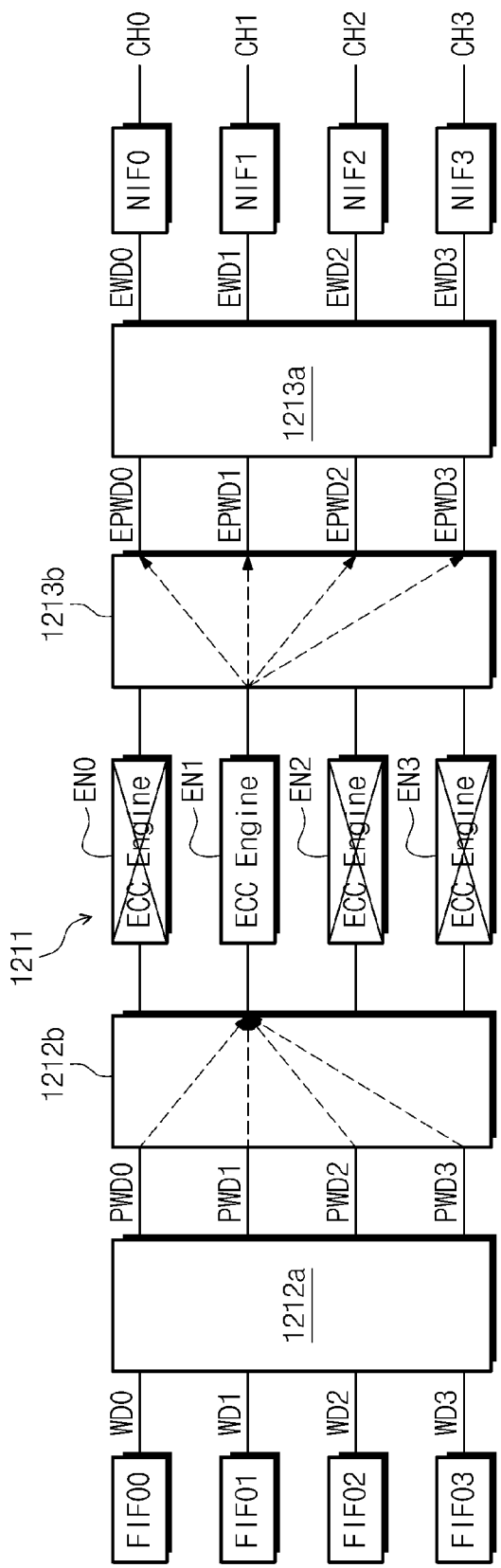
FIG. 7 is a diagram illustrating a encoding operation when a memory system according to an embodiment of the inventive concepts operates at a peak power management mode.

FIG. 7 is a diagram illustrating an encoding operation when a memory system according to an embodiment of the inventive concepts operates at a peak power management mode.

For ease of description, it is assumed that a memory controller 1200 is connected with storage medium 1100 via four channels CH0 to CH3. Also, it is assumed that an ECC block 1211 is formed of four ECC engines EN0 to EN3. However, the number of ECC engines included in the ECC block 1211 may not be limited thereto. For example, the number of ECC engines included in the ECC block 1211 may be more than the number of channels. Alternatively, the number of ECC engines included in the ECC block 1211 may be less than the number of channels.

In the case that management of peak power is required, a CPU 1240 of the memory controller 1200 may control an encoding/decoding block 1210 such that a part of the ECC engines EN0 to EN3 of the ECC block 1211 is activated. For example, the CPU 1240 of the memory controller 1200 may decide a value of a register 1214 of the encoding/decoding block 1210 such that one EN1 of the ECC engines EN0 to EN3 of the ECC block 1211 is activated. As a value of the register 1214 is decided, the ECC engine EN1 may be activated, while the remaining ECC engines EN0, EN2, and EN3 may not be activated.

Under the above condition, write data WD0 to WD3 transferred from a buffer memory 1270 via a buffer controller and arbiter block 1250 may be transferred to a packetizer 1211a via FIFOs FIFO0 to FIFO3. The packetizer 1212a may generate packet data PWD0 to PWD3 by adding control information to the write data WD0 to WD3 input via the FIFOs FIFO0 to FIFO3 based on a state of the activated ECC engine EN1. Herein, the control information may include destination information appointing a channel to which data is to be transferred and engine selection information indicating an ECC engine to which packet data is to be transferred. Since one ECC engine EN1 is activated, the engine selection information may be set to a value indicating the ECC engine EN1.

A bus matrix 1212b may transfer the packet data PWD0 to PWD3 sequentially transferred from the packetizer 1212a to the activated ECC engine EN1, based on control information included in each of the packet data PWD0 to PWD3. A bus matrix 1213b may transfer packet data EPWD0 to EPWD3 encoded by the ECC engine EN1 to a packetizer 1213b, based on control information (i.e., destination information) included in each of the encoded packet data EPWD0 to EPWD3. The packetizer 1213b may remove control information included in the encoded packet data EPWD0 to EPWD3 transferred via the bus matrix 1213a to transfer encoded data EWD0 to EWD3 to corresponding channels CH0 to CH3 via NAND interface units NIF0 to NIF3, respectively. The encoded data EWD0 to EWD3 transferred to the channels CH0 to CH3 may be stored at storage medium 1100.

According to at least one example embodiment of the inventive concepts, it is assumed that one ECC engine processes 400 MB data per second. With this assumption, if all of four ECC engines are activated, the ECC block 1211 may process 1.6 GB data per second. In the case that management of peak power is required, one of ECC engines EN0 to EN3 may be activated such that throughput of the ECC block 1211 is reduced to ¼ of full output. In this case, peak power may be reduced to ¼ of full output. As understood from the above description, peak power of a memory system 1000 may be reduced by activating less than all (e.g., one) of ECC engines under the condition that all channels CH0 to CH3 are used.

An example in which a signal processing level of the encoding/decoding block 1210 is decided according to a value of a register 1214 is described with reference to FIGS. 2 to 8. However, at least some embodiments of the inventive concepts are not limited thereto. For example, the register 1214 of the encoding/decoding block 1210 can be removed. In this case, a signal processing level may be adjusted using state information of input data (e.g., information indicating error level, PE cycle level, etc.). As another example, a signal processing level can be adjusted using state information of data together with the register 1214 of the encoding/decoding block 1210. In this case, a default signal processing level of the encoding/decoding block 1210 may be decided according to a value of the register 1214, and may be adjusted according to state information of input data.

Figure 8:
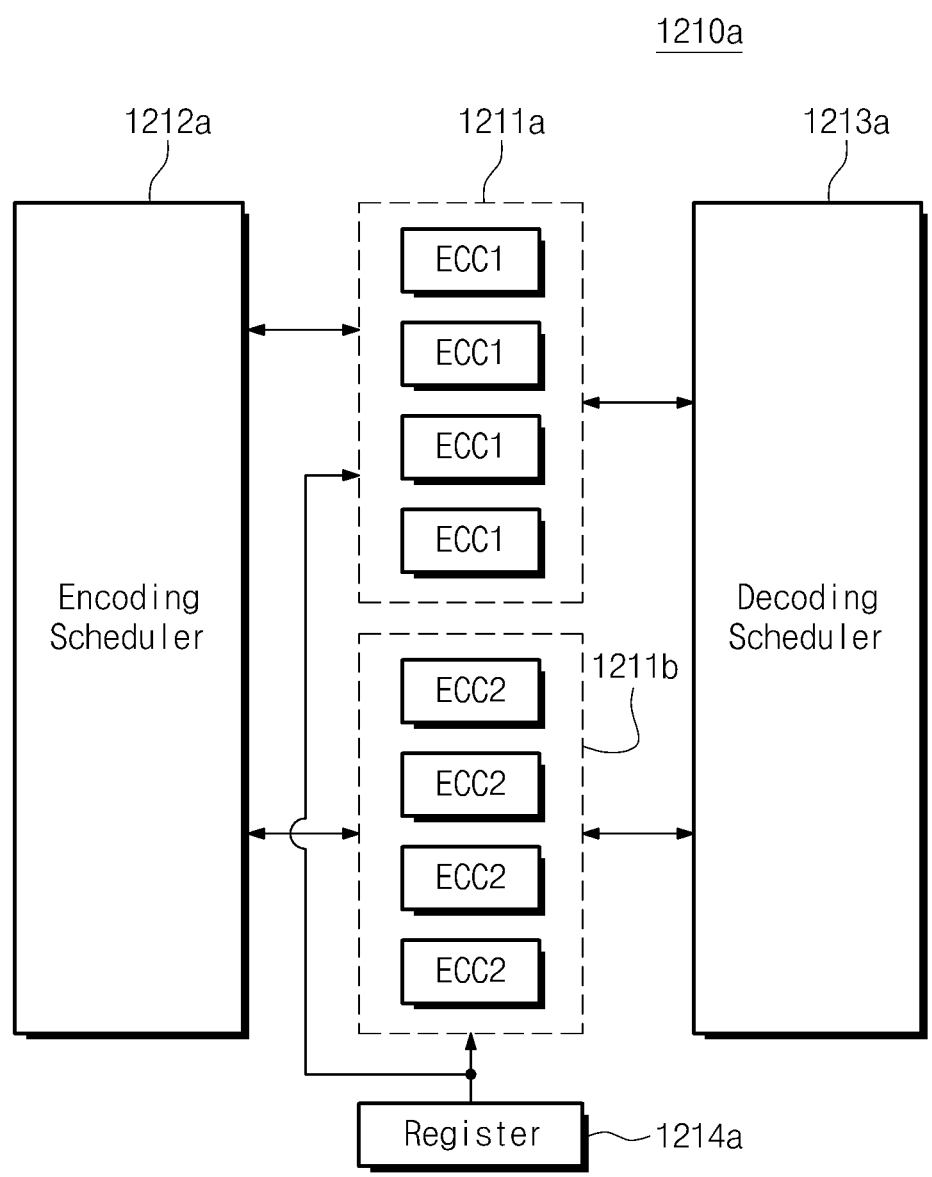
FIG. 8 is a block diagram schematically illustrating an encoding/decoding block according to another embodiment of the inventive concepts.

FIG. 8 is a block diagram schematically illustrating an encoding/decoding block according to another embodiment of the inventive concepts.

Referring to FIG. 8, an encoding/decoding block 1210a may include a first ECC block 1211a as a first signal processing block, a second ECC block 1211b as a second signal processing block, an encoding scheduler 1212a, a decoding scheduler 1213a, and a register 1214a. An error correction code algorithm of the first ECC block 1211a may be different from that of the second ECC block 1211b. For example, the first ECC block 1211a may be formed of ECC engines (or, signal processing engines) ECC1 operating in a Bose-Chaudhuri-Hocquenghem (BCH) manner, and the second ECC block 1211b may be formed of ECC engines (or, signal processing engines) ECC2 operating in an Low-density parity-check (LDPC) manner. However, at least some embodiments of the inventive concepts are not limited thereto. One of the first and second ECC blocks 1211a and 1211b may be selected according to a value of the register 1214a set by a CPU 1240. For example, the CPU 1240 may decide a value of the register 1214a using an error rate. When the error rate is below a reference value, the CPU 1240 may decide a value of the register 1214a such that the first ECC block 1211a is selected. When the error rate is over the reference value, the CPU 1240 may decide a value of the register 1214a such that the second ECC block 1211b is selected. Data encoding and decoding operations may be performed via ECC engines of the selected ECC block.

Data encoding and decoding operations performed via ECC engines of the selected ECC block may be controlled by the encoding and decoding schedulers 1212a and 1213a. This may be performed substantially the same as described with reference to FIGS. 5 to 7, and a description thereof is thus omitted.

Figure 9A:
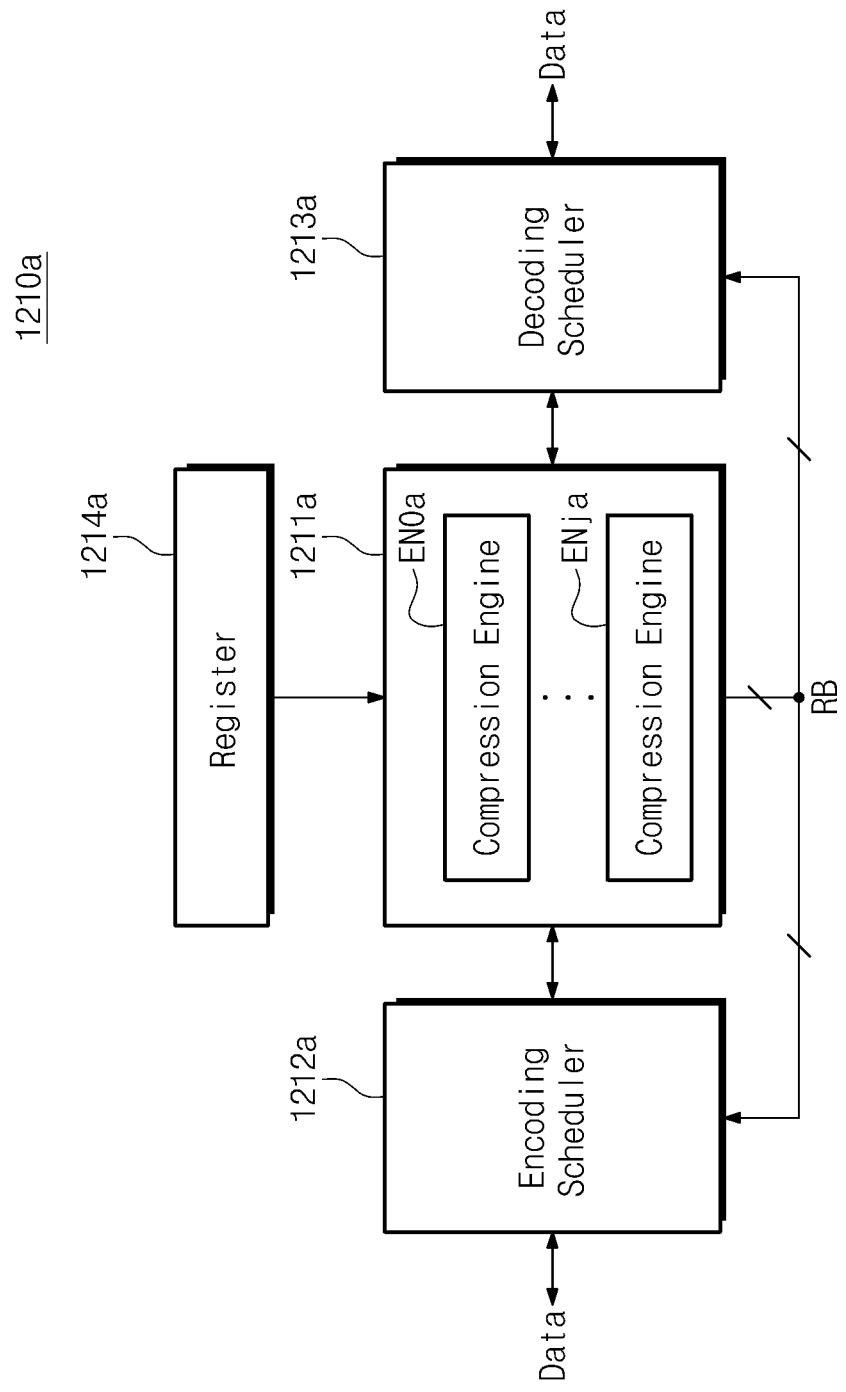
FIG. 9A is a block diagram schematically illustrating an encoding/decoding block according to another embodiment of the inventive concepts.

FIG. 9A is a block diagram schematically illustrating an encoding/decoding block according to another embodiment of the inventive concepts.

Referring to FIG. 9A, an encoding/decoding block 1210a may include a compression block 1211a as a signal processing block, an encoding scheduler 1212a, a decoding scheduler 1213a, and a register 1214a. The compression block 1211a may include a plurality of compression engines EN0a to ENja as signal processing engines. The number of compression engines EN0a to ENja may be more or less than the number of channels CH0 to CHi or the same as the number of channels CH0 to CHi.

Activation and inactivation of the compression engines EN0a to ENja may be decided according to a value stored at the register 1214a. A value of the register 1214a may be decided in view of operating conditions of a memory controller 1200 for example, in the same manner discussed above with reference to FIGS. 5-7. A part or all of the compression engines EN0a to ENja may be activated according to a value stored at the register 1214a. Activation and inactivation of the compression engines EN0a to ENja may be decided according to state information of input data without the register 1214a (or, regardless of a value of the register 1214a).

The encoding scheduler 1212a may receive data to be encoded, select one or more compression engines of compression engines having a ready state in view of states of activated compression engines of the compression block 1211a, and provide data to be encoded to the selected compression engine. The decoding scheduler 1213a may receive data to be decoded, select one or more compression engines of compression engines having a ready state in view of states of activated compression engines of the compression block 1211a, and provide data to be decoded to the selected compression engine. The compression engines EN0a to ENja may be connected to channels CH0 to CHi via the decoding scheduler 1213a. One compression engine may be configured to decode data transferred from a part or all of the channels CH0 to CHi and to encode data to be transferred to a part or all of the channels CH0 to CHi. In other words, data transferred via one channel may be decoded via one or more compression engines of activated compression engines. Likewise, data to be sent to storage medium 1100 may be encoded via one or more compression engines of activated compression engines.

With the encoding/decoding block 1210a according to at least one example embodiment of the inventive concepts, the number of compression engines participating in decoding and encoding may be adjusted in real time or in advance according to operating conditions. Also, encoding/decoding of data may be performed by a selected compression engine(s) (having a ready state) in view of states of activated compression engines.

Figure 9B:
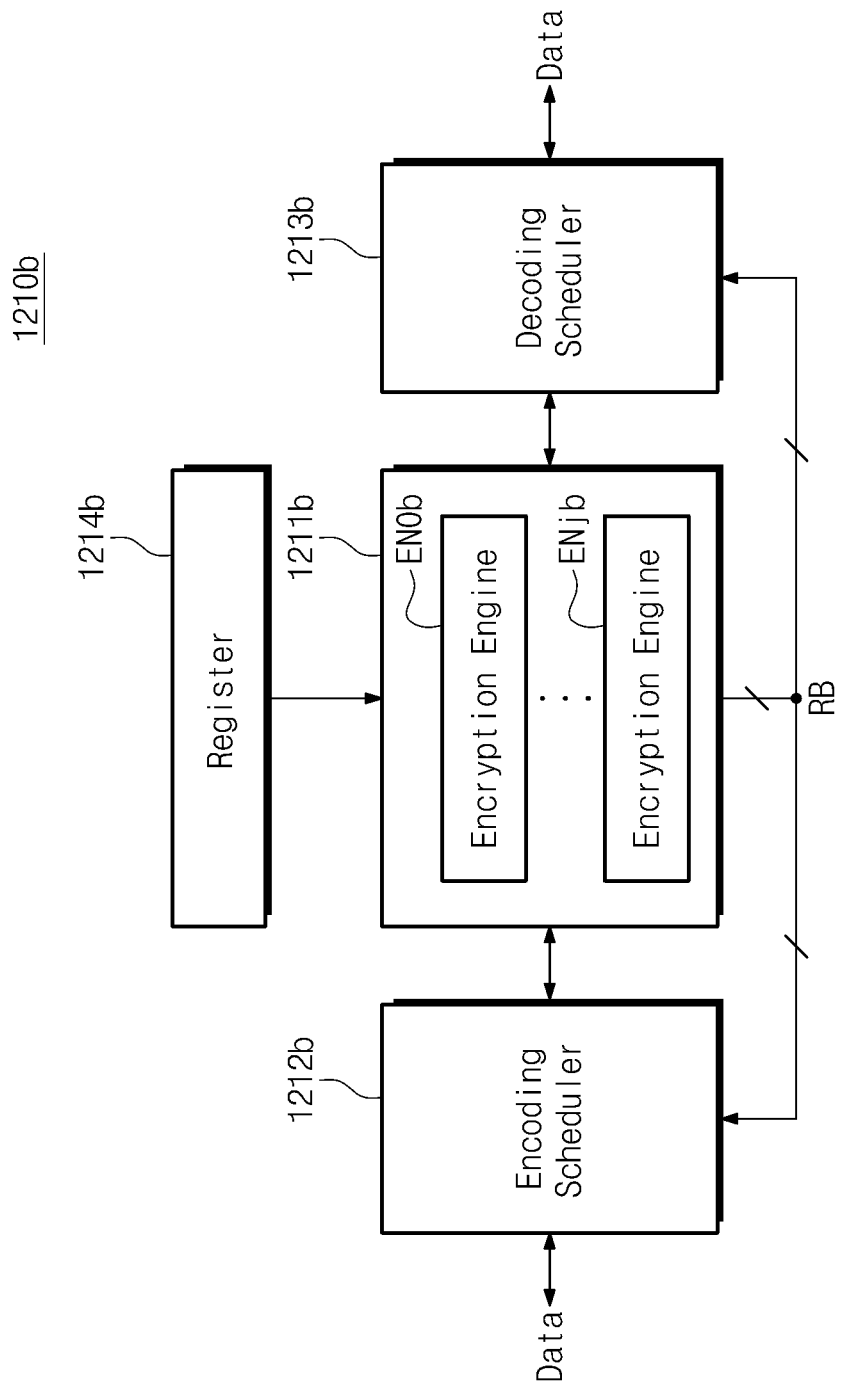
FIG. 9B is a block diagram schematically illustrating an encoding/decoding block according to still another embodiment of the inventive concepts.

FIG. 9B is a block diagram schematically illustrating an encoding/decoding block according to still another embodiment of the inventive concepts.

Referring to FIG. 9B, an encoding/decoding block 1210b may include an encryption block 1211b as a signal processing block, an encoding scheduler 1212b, a decoding scheduler 1213b, and a register 1214b. The encryption block 1211b may include a plurality of encryption engines EN0b to ENjb as signal processing engines. The number of encryption engines EN0b to ENjb may be more or less than the number of channels CH0 to CHi or the same as the number of channels CH0 to CHi.

Activation and inactivation of the encryption engines EN0b to ENjb may be decided according to a value stored at the register 1214b. A value of the register 1214b may be decided in view of operating conditions of a memory controller 1200 for example, in the same manner discussed above with reference to FIGS. 5-7. A part or all of the encryption engines EN0b to ENjb may be activated according to a value stored at the register 1214b. Activation and inactivation of the encryption engines EN0b to ENjb may be decided according to state information of input data without the register 1214b (or, regardless of a value of the register 1214b).

The encoding scheduler 1212b may receive data to be encoded, select one or more encryption engines of encryption engines having a ready state in view of states of activated encryption engines of the encryption block 1211b, and provide data to be encoded to the selected encryption engine. The decoding scheduler 1213b may receive data to be decoded, select one or more encryption engines of encryption engines having a ready state in view of states of activated encryption engines of the encryption block 1211b, and provide data to be decoded to the selected encryption engine. The encryption engines EN0b to ENjb may be connected to channels CH0 to CHi via the decoding scheduler 1213b. One encryption engine may be configured to decode data transferred from a part or all of the channels CH0 to CHi and to encode data to be transferred to a part or all of the channels CH0 to CHi. In other words, data transferred via one channel may be decoded via one or more encryption engines of activated encryption engines. Likewise, data to be sent to storage medium 1100 may be encoded via one or more encryption engines of activated encryption engines.

With the encoding/decoding block 1210b according to at least one example embodiment of the inventive concepts, the number of encryption engines participating in decoding and encoding may be adjusted in real time or in advance according to operating conditions. Also, encoding/decoding of data may be performed by a selected encryption engine(s) (having a ready state) in view of states of activated encryption engines.

Figure 9C:
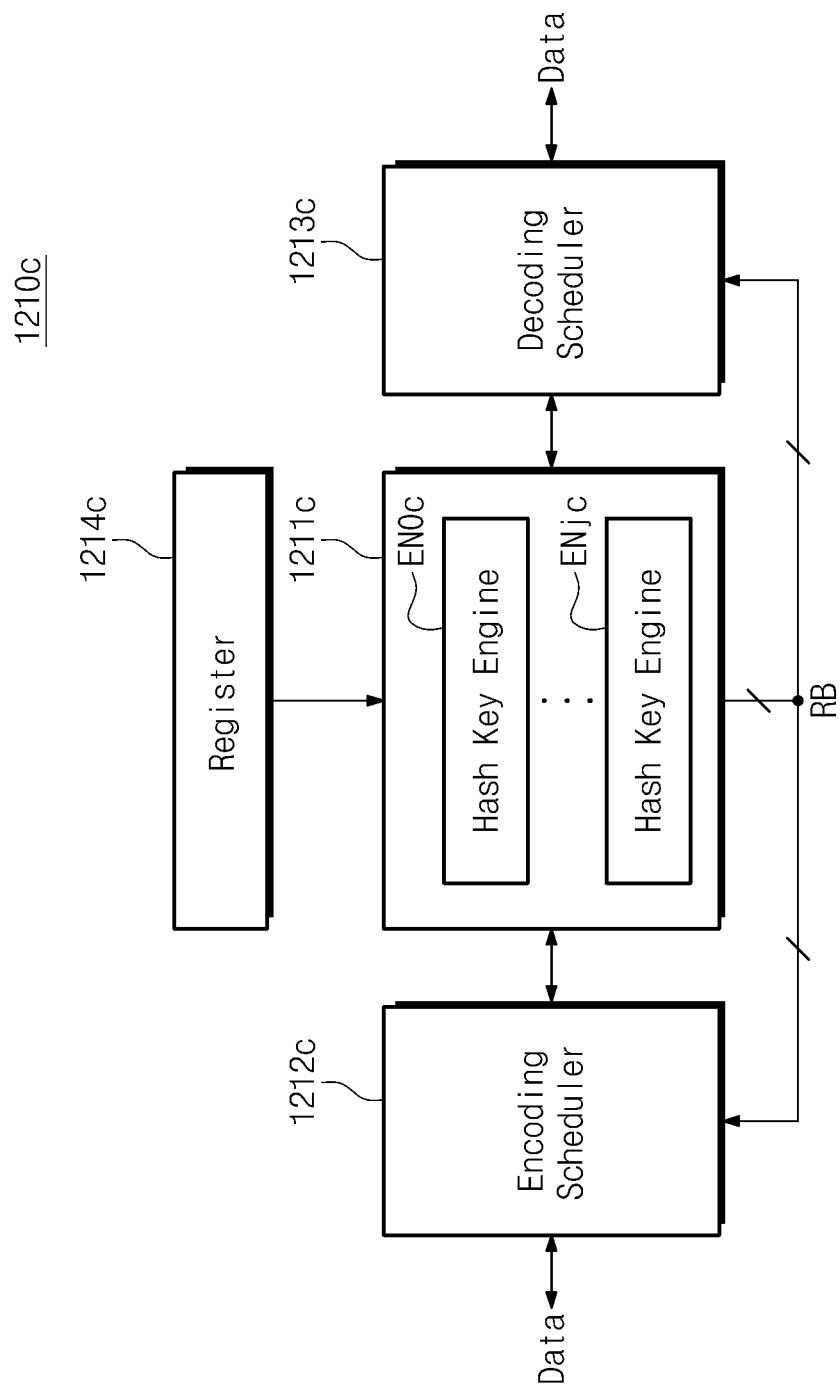
FIG. 9C is a block diagram schematically illustrating an encoding/decoding block according to still another embodiment of the inventive concepts.

FIG. 9C is a block diagram schematically illustrating an encoding/decoding block according to still another embodiment of the inventive concepts.

Referring to FIG. 9C an encoding/decoding block 1210c may include a hash key generating block 1211c as a signal processing block, an encoding scheduler 1212c, a decoding scheduler 1213c, and a register 1214c. The hash key generating block 1211c may include a plurality of hash key engines EN0c to ENjc as signal processing engines. The number of hash key engines EN0c to ENjc may be more or less than the number of channels CH0 to CHi or the same as the number of channels CH0 to CHi.

Activation and inactivation of the hash key engines EN0c to ENjc may be decided according to a value stored at the register 1214c. A value of the register 1214c may be decided in view of operating conditions of a memory controller 1200 for example, in the same manner discussed above with reference to FIGS. 5-7. A part or all of the hash key engines EN0c to ENjc may be activated according to a value stored at the register 1214c. Activation and inactivation of the hash key engines EN0c to ENjc may be decided according to state information of input data without the register 1214c (or, regardless of a value of the register 1214c).

The encoding scheduler 1212c may receive data to be encoded, select one or more hash key engines of hash key engines having a ready state in view of states of activated hash key engines of the hash key generating block 1211c, and provide data to be encoded to the selected encryption engine. The decoding scheduler 1213c may receive data to be decoded, select one or more hash key engines of hash key engines having a ready state in view of states of activated hash key engines of the hash key generating block 1211c, and provide data to be decoded to the selected hash key engine. The hash key engines EN0c to ENjc may be connected to channels CH0 to CHi via the decoding scheduler 1213b. One hash key engine may be configured to decode data transferred from a part or all of the channels CH0 to CHi and to encode data to be transferred to a part or all of the channels CH0 to CHi. In other words, data transferred via one channel may be decoded via one or more hash key engines of activated hash key engines. Likewise, data to be sent to storage medium 1100 may be encoded via one or more hash key engines of activated hash key engines.

With the encoding/decoding block 1210c according to at least one example embodiment of the inventive concepts, the number of hash key engines participating in decoding and encoding may be adjusted in real time or in advance according to operating conditions. Also, encoding/decoding of data may be performed by a selected hash key engine(s) (having a ready state) in view of states of activated hash key engines.

In FIGS. 2 to 9C, there are described embodiments using an ECC engine, a compression engine, a hash key engine as a signal processing engine. However, at least some example embodiments of the inventive concepts may be applicable to other function engines.

Figure 10:
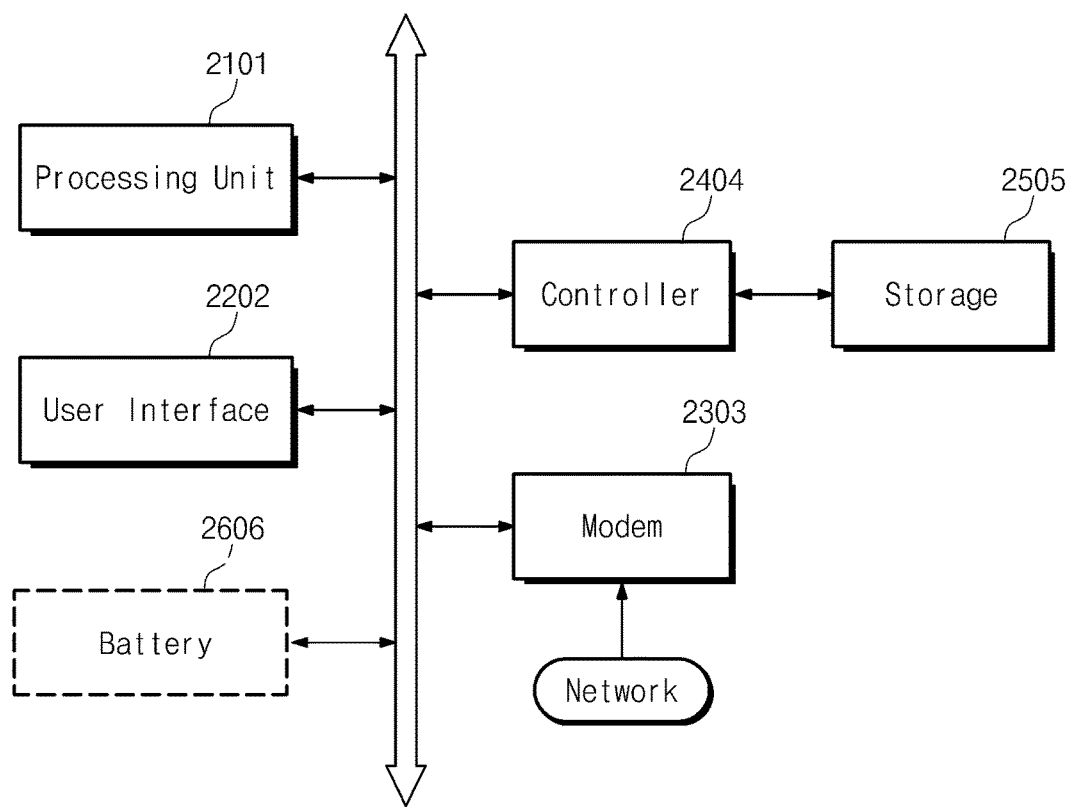
FIG. 10 is a block diagram schematically illustrating a computing system including a data storage device according to an embodiment of the inventive concepts.

FIG. 10 is a block diagram schematically illustrating a computing system including a data storage device according to an embodiment of the inventive concepts. A computing system includes a processing unit 2101, a user interface 2202, a modem 2303 such as a baseband chipset, a memory controller 2404, and a nonvolatile memory device 2505 as storage medium.

The memory controller 2404 may include, for example, the same structure and have the same operation as any of the examples described above with reference to in FIG. 1-9C. For example, the memory controller 2404 may be configured such that data is encoded and decoded by a selected signal processing engine in view of states of signal processing engines. An encoding/decoding manner according to at least one embodiment of the inventive concepts may enable tuning of power and performance of the memory controller 2404. Also, the encoding/decoding manner according to at least one embodiment of the inventive concepts may enable the signal processing efficiency to be improved.

N-bit data (N being 1 or more integer) processed/to be processed by the processing unit 2101 may be stored in the storage medium 2505 through the memory controller 2404. In the event that the computing system is a mobile device, a battery 2606 may be further included in the computing system to supply an operating voltage thereto. Although not illustrated in FIG. 10, the computing system may further comprise an application chipset, a camera image processor (CIS), a mobile DRAM, and the like.

Figure 11:
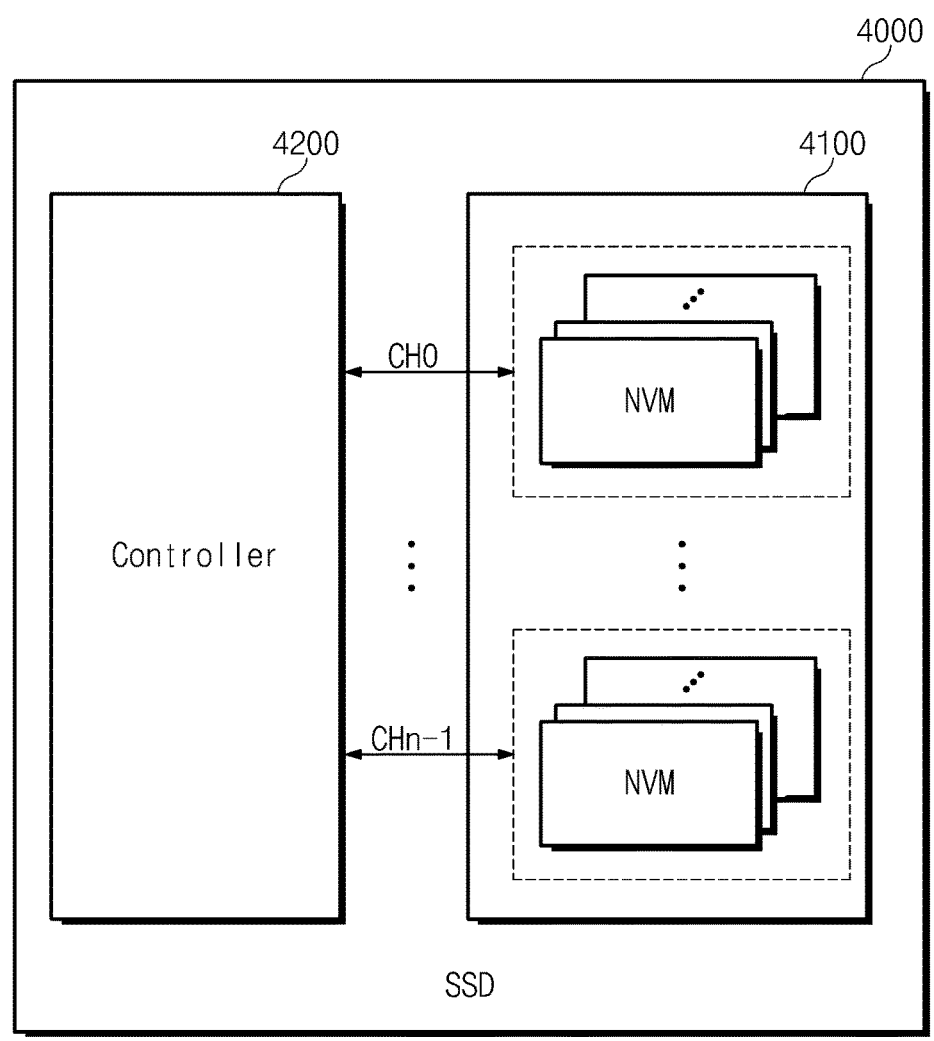
FIG. 11 is a block diagram schematically illustrating a solid state drive according to an embodiment of the inventive concepts.

FIG. 11 is a block diagram schematically illustrating a solid state drive according to an embodiment of the inventive concepts.

Referring to FIG. 11, a solid state drive (SSD) 4000 may comprise storage medium 4100 and a controller 4200. The storage medium 4100 may be connected with the controller 4200 via a plurality of channels, each of which is commonly connected with a plurality of nonvolatile memories. The controller 4200 may include, for example, the same structure and have the same operation as any of the examples described above with reference to in FIG. 1-9C. For example, the controller 4200 may be configured such that data is encoded and decoded by a selected signal processing engine in view of states of signal processing engines. An encoding/decoding manner according to at least one embodiment of the inventive concepts may enable tuning of power and performance of the controller 4200. Also, the encoding/decoding manner according to at least one embodiment of the inventive concepts may enable the signal processing efficiency to be improved.

Figure 12:
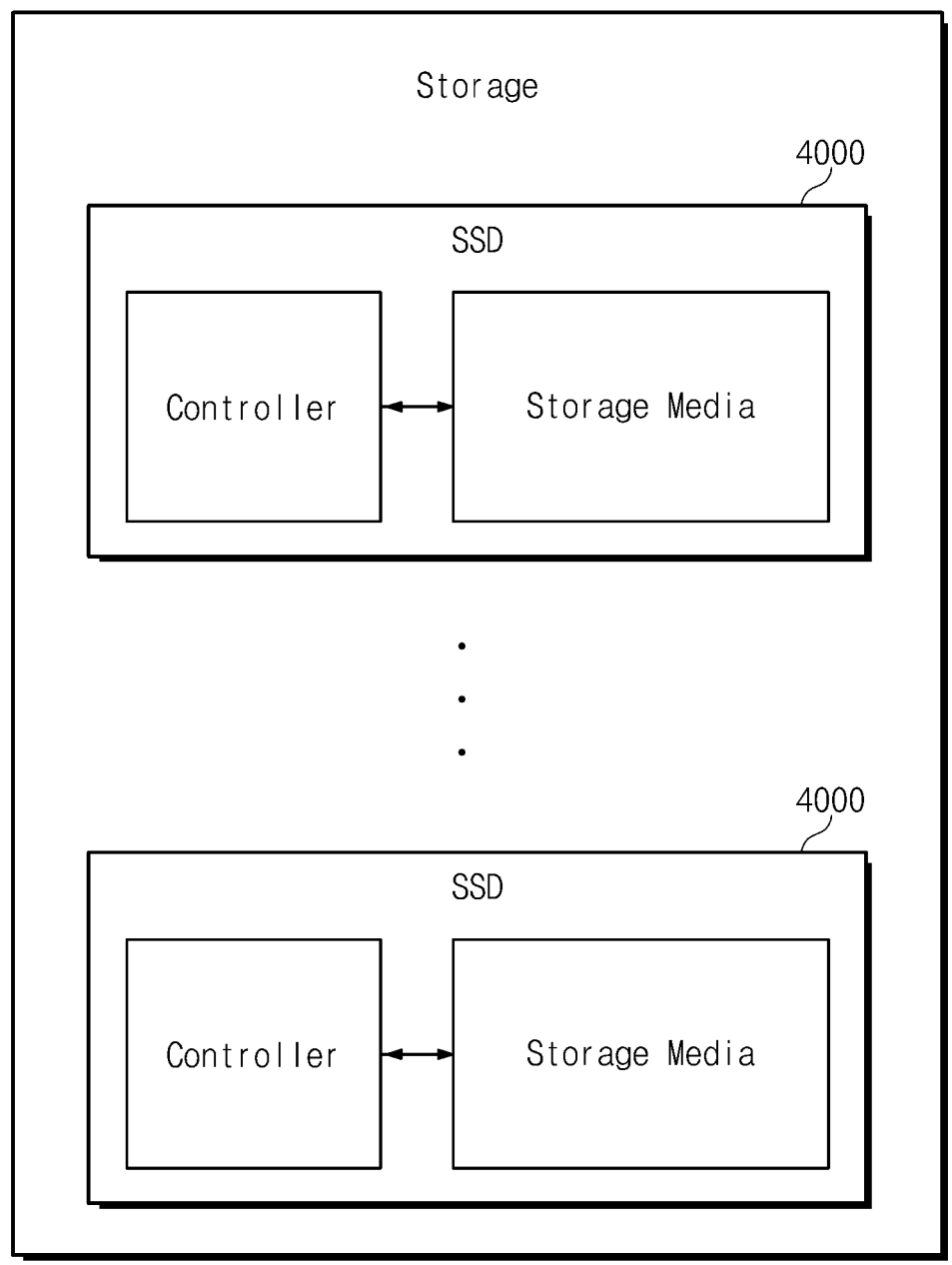
FIG. 12 is a block diagram schematically illustrating a storage using a solid state drive in FIG. 11.
Figure 13:
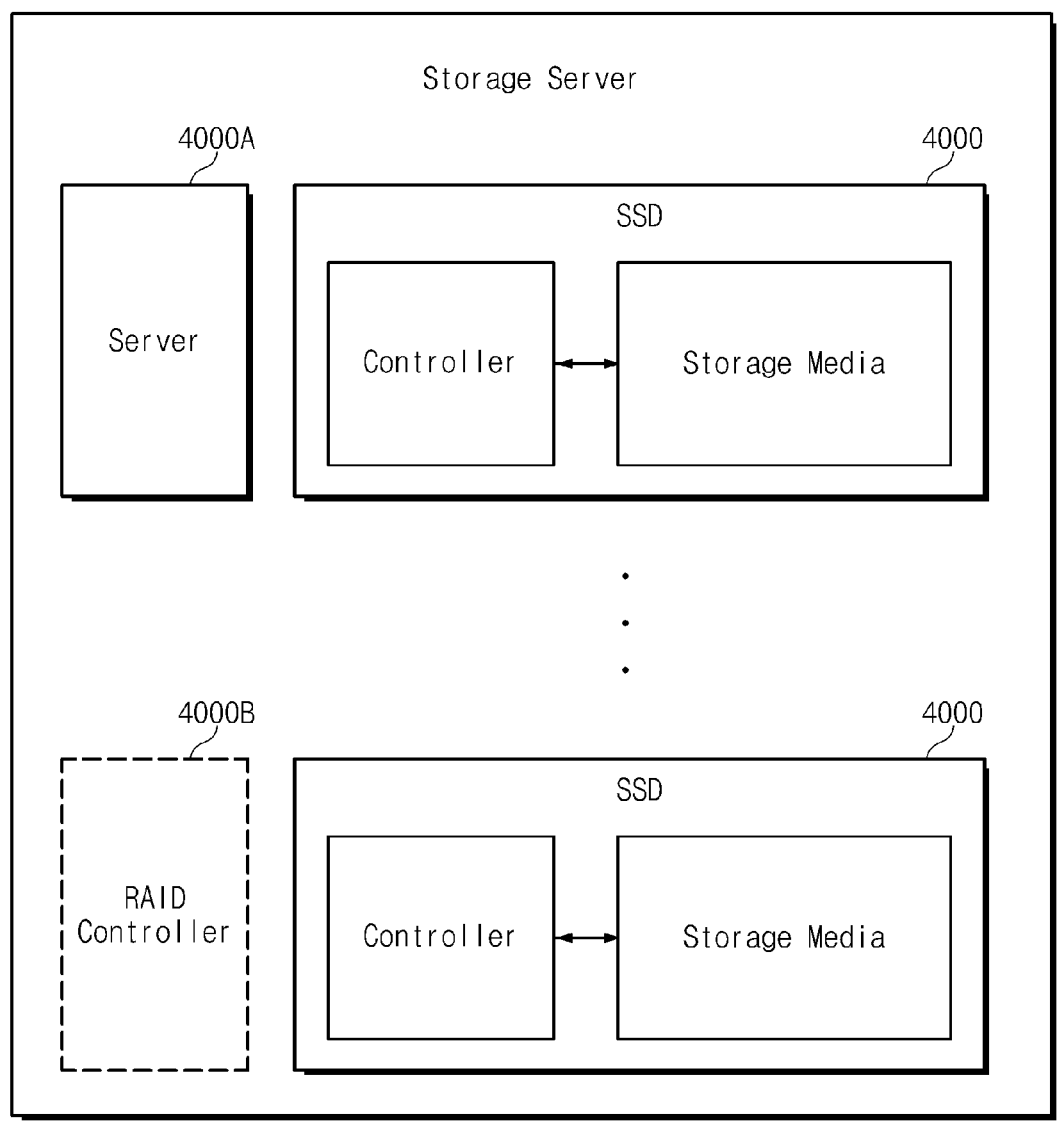
FIG. 13 is a block diagram schematically illustrating a storage server using a solid state drive in FIG. 11.

FIG. 12 is a block diagram schematically illustrating a storage using a solid state drive in FIG. 11, and FIG. 13 is a block diagram schematically illustrating a storage server using a solid state drive in FIG. 11.

An SSD 4000 according to an embodiment of the inventive concepts may be used to form the storage. As illustrated in FIG. 12, the storage may include a plurality of solid state drives 4000 which are configured the same as described in FIG. 11. An SSD 4000 according to an embodiment of the inventive concepts may be used to configure a storage sever. As illustrated in FIG. 13, a storage server includes a plurality of solid state drives 4000, which are configured the same as described in FIG. 11, and a server 4000A. Further, it is well comprehended that a well-known RAID controller 4000B is provided in the storage server.

Figure 14:
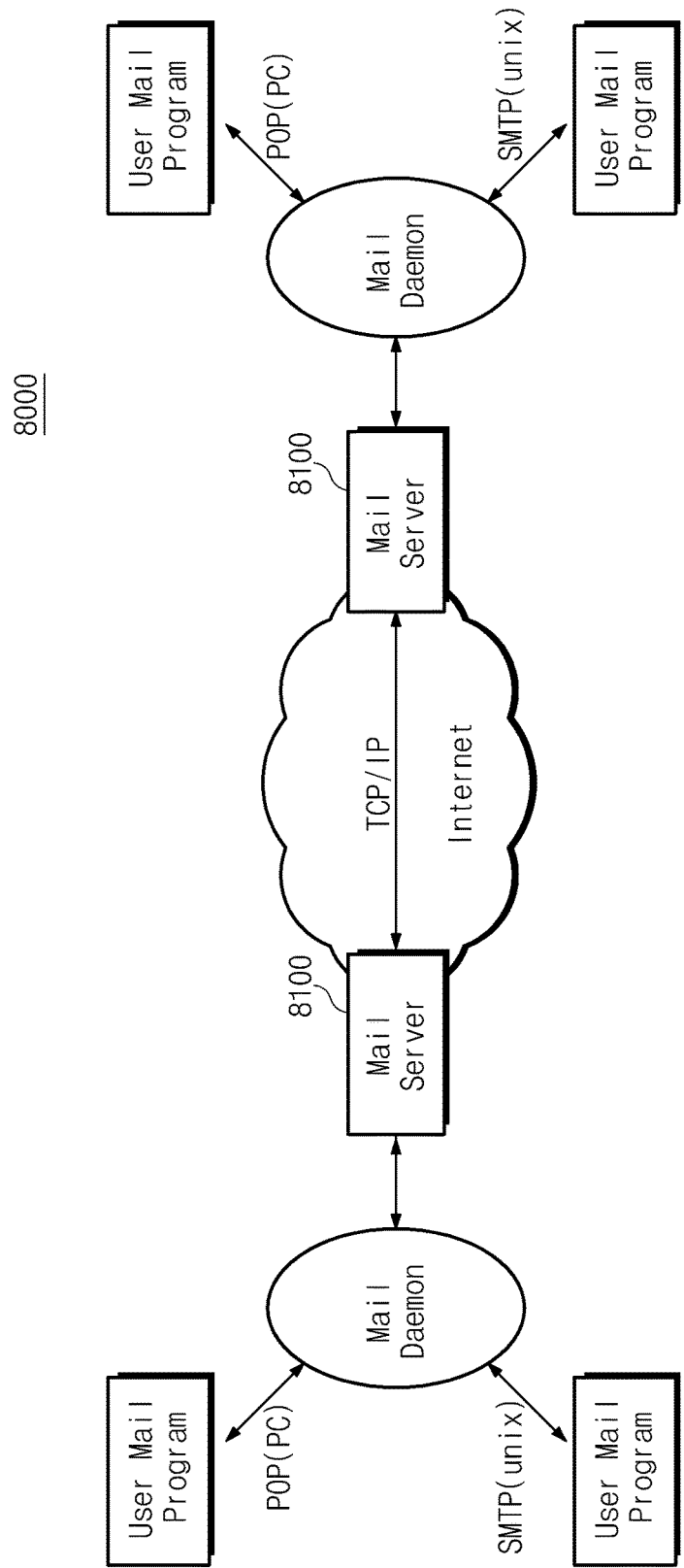
FIG. 14 is a diagram schematically illustrating systems to which a data storage device according to at least some embodiments of the inventive concepts is applied.

FIG. 14 is a diagram schematically illustrating systems to which a data storage device according to at least some embodiments of the inventive concepts is applied.

As illustrated in FIG. 14, a solid state drive including a data storage device according to an embodiment of the inventive concepts may be applied to a main server 8100.

Figure 15:
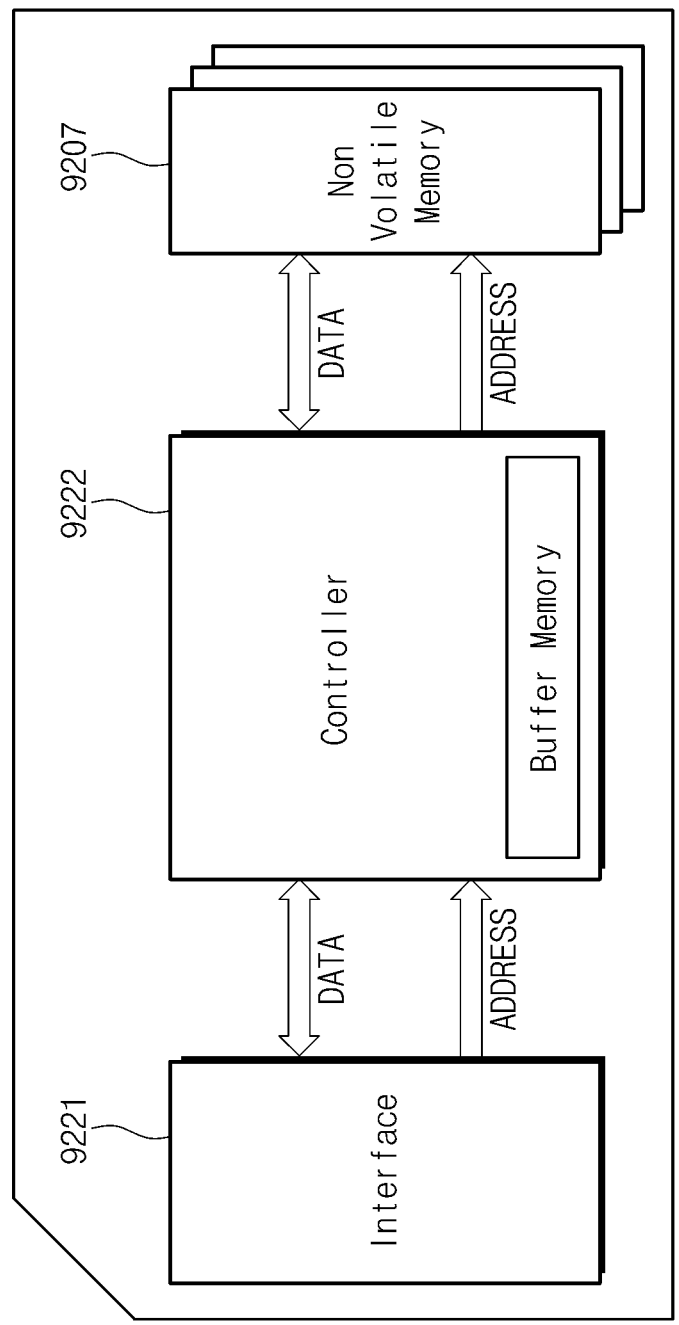
FIG. 15 is a block diagram schematically illustrating a memory card according to an embodiment of the inventive concepts.

FIG. 15 is a block diagram schematically illustrating a memory card according to an embodiment of the inventive concepts.

A memory card, for example, may be an MMC card, an SD card, a multiuse card, a micro-SD card, a memory stick, a compact SD card, an ID card, a PCMCIA card, an SSD card, a chip-card, a smartcard, an USB card, or the like.

Referring to FIG. 15, the memory card may include an interface circuit 9221 for interfacing with an external device, a controller 9222 including a buffer memory and controlling an operation of the memory card, and at least one nonvolatile memory device 9207. The controller 9222 may be a processor which is configured to control write and read operations of the nonvolatile memory device 9207. The controller 9222 may be coupled with the nonvolatile memory device 9207 and the interface circuit 9221 via a data bus and an address bus.

The controller 9222 may include, for example, the same structure and have the same operation as any of the examples described above with reference to in FIG. 1-9C. For example, the controller 9222 may be configured such that data is encoded and decoded by a selected signal processing engine in view of states of signal processing engines. An encoding/decoding manner according to at least one embodiment of the inventive concepts may enable tuning of power and performance of the controller 9222. Also, the encoding/decoding manner according to at least one embodiment of the inventive concepts may enable the signal processing efficiency to be improved.

Figure 16:
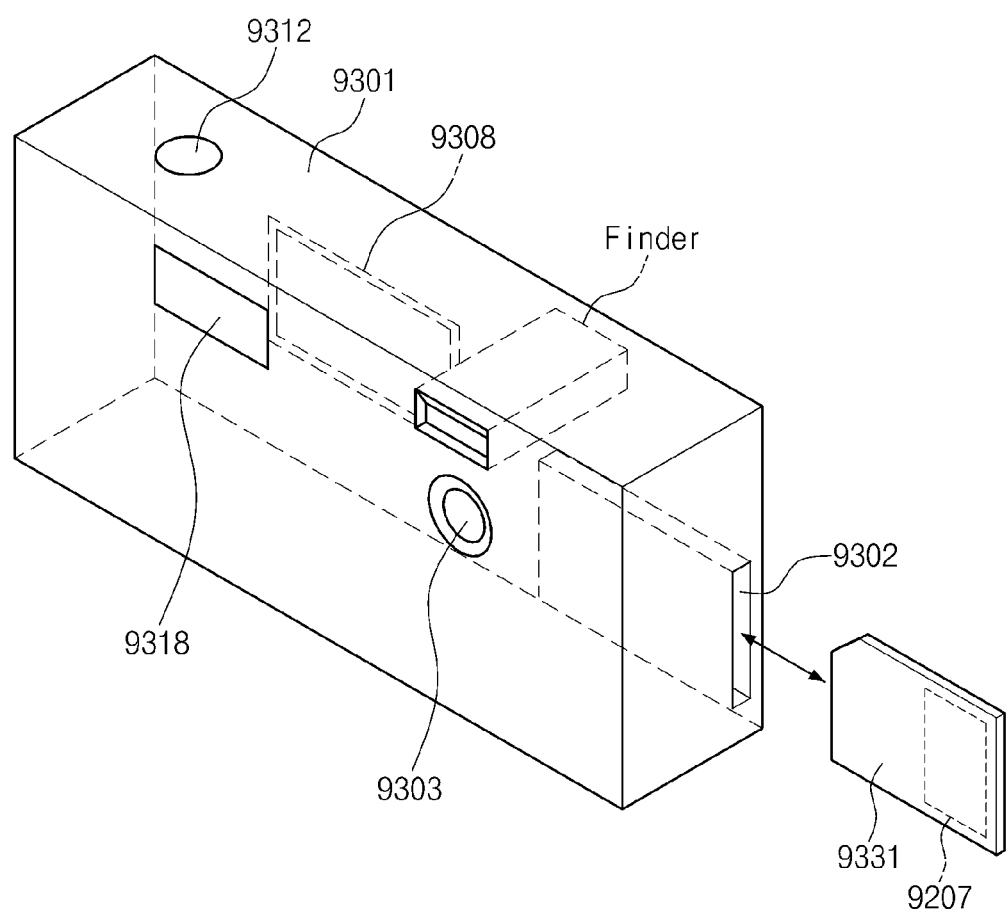
FIG. 16 is a block diagram schematically illustrating a digital still camera according to an embodiment of the inventive concepts.

FIG. 16 is a block diagram schematically illustrating a digital still camera according to an embodiment of the inventive concepts.

Referring to FIG. 16, a digital still camera may include a body 9301, a slot 9302, a lens 9303, a display circuit 9308, a shutter button 9312, a strobe 9318, and the like. The memory card 9331 may include a memory controller and storage medium described in FIG. 1. For example, the memory controller included in the memory card 9331 may include, for example, the same structure and have the same operation as any of the examples described above with reference to in FIG. 1-9C. The controller may be configured such that data is encoded and decoded by a selected signal processing engine in view of states of signal processing engines. An encoding/decoding manner according to at least one embodiment of the inventive concepts may enable tuning of power and performance of the controller. Also, the encoding/decoding manner according to at least one embodiment of the inventive concepts may enable the signal processing efficiency to be improved.

If the memory card 9331 has a contact type, an electric circuit on a circuit board may be electrically contacted with the memory card 9331 when it is inserted in the slot 9302. In the event that the memory card 9331 has a non-contact type, an electric circuit on a circuit board may communicate with the memory card 9331 in a radio-frequency manner.

Figure 17:
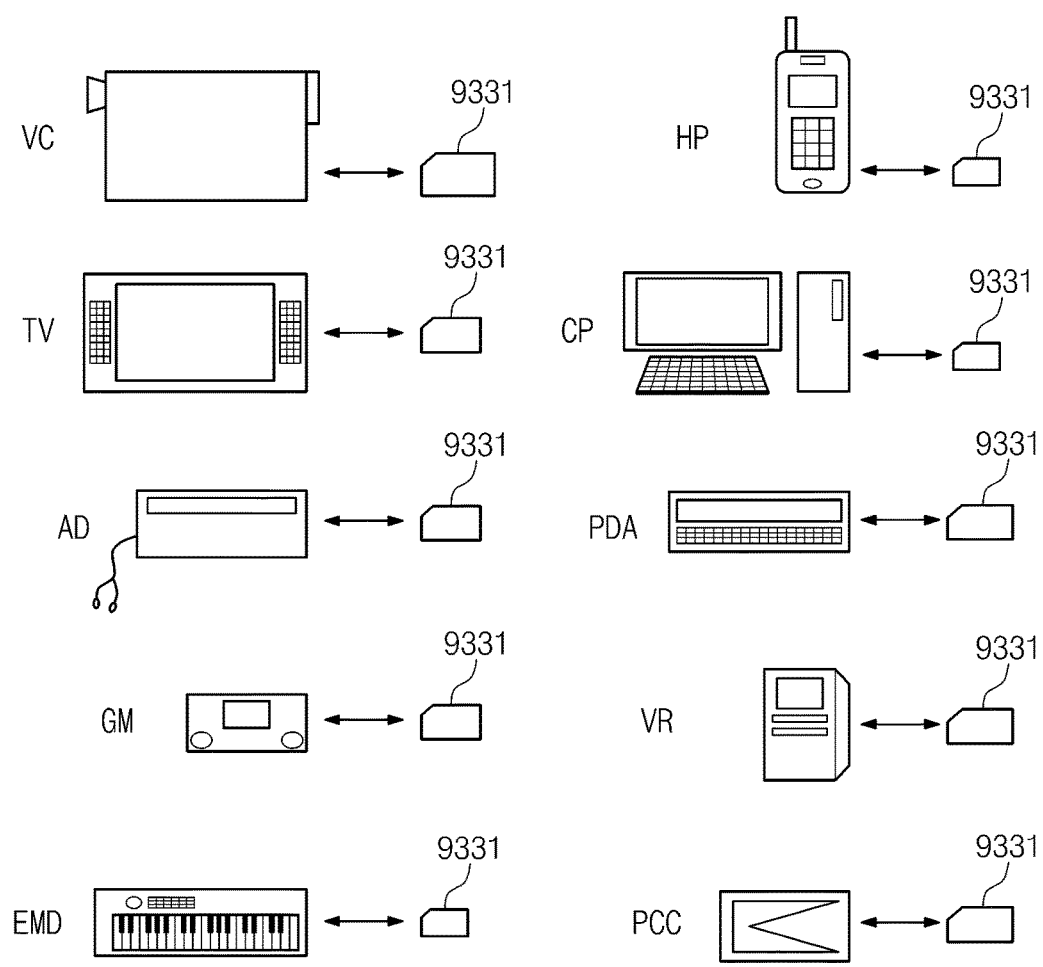
FIG. 17 is a diagram schematically illustrating various systems to which a memory card in FIG. 15 is applied.

FIG. 17 is a diagram schematically illustrating various systems to which a memory card in FIG. 15 is applied.

Referring to FIG. 17, a memory card 9331 may be applied to a video camera VC, a television TV, an audio device AD, a game machine GM, an electronic music device EMD, a cellular phone HP, a computer CP, a Personal Digital Assistant (PDA), a voice recorder VR, a PC card PCC, and the like.

In example embodiment, memory cells can be formed of a variable resistance memory cell. An exemplary variable resistance memory cell and a memory device including the same are disclosed in U.S. Pat. No. 7,529,124, the entirety of which is incorporated by reference herein.

In other example embodiments, memory cells can be formed of one of various cell structures having a charge storage layer. Cell structures having a charge storage layer include a charge trap flash structure using a charge trap layer, a stack flash structure in which arrays are stacked at multiple layers, a source-drain free flash structure, a pin-type flash structure, and the like.

In still other example embodiments, a memory device having a charge trap flash structure as a charge storage layer is disclosed in U.S. Pat. No. 6,858,906 and U.S. Patent Publication Nos. 2004/0169238 and 2006/0180851, the entirety of each of which is incorporated by reference herein. A source-drain free flash structure is disclosed in KR Patent No. 673020, the entirety of which is incorporated by reference herein.

A non-volatile memory device and/or a memory controller according to at least one example embodiment of the inventive concepts may be packed using various types of packages. For example, A non-volatile memory device or a memory controller according to at least one example embodiment of the inventive concepts may be packed using packages such as PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

Example embodiments of the inventive concepts having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A memory controller which is connected with a storage medium via a plurality of channels, comprising:
   a signal processing block including a plurality of signal processing engines;
   a decoding scheduler configured to control a data path based on an operating condition of the memory controller, such that at least one activated signal processing engine of the plurality of signal processing engines is connected with the plurality of channels, respectively;
   a plurality of first in first out buffers (FIFOs) configured to temporarily store data to be transferred to the plurality of channels; and
   a first bus matrix configured to sequentially transfer first packet data, which includes data output from the plurality of FIFOs respectively, to the at least one activated signal processing engine based on control information included in the first packet data.

2. The memory controller of claim 1, further comprising:
   a CPU configured to determine an operating condition of the memory controller; and
   a register configured to store activation information of the plurality of signal processing engines, the memory controller being configured such that the activation information is decided according to a determination result of the CPU.

3. The memory controller of claim 2, wherein the memory controller is configured such that part or all of the plurality of signal processing engines is activated by the activation information stored at the register.

4. The memory controller of claim 1, further comprising:
an encoding scheduler configured to control a data path such that data in the plurality of FIFOs is transferred to the at least one activated signal processing engine from among the plurality of signal processing engines.

5. The memory controller of claim 4, wherein the encoding scheduler comprises:
a first packet generator configured to generate the first packet data by adding the control information to data output from each of the plurality of FIFOs based on a state of the at least one activated signal processing engine; and
the first bus matrix.

6. The memory controller of claim 5, wherein the decoding scheduler comprises:
a second packet generator configured to generate second packet data by adding control information to data output from each of the plurality of channels based on a state of the at least one activated signal processing engine; and
a second bus matrix configured to sequentially transfer the second packet data, which corresponds respectively to the plurality of channels, to the at least one activated signal processing engine based on the control information included in the second packet data.

7. The memory controller of claim 6, further comprising:
a CPU configured to determine an operating condition of the memory controller; and
a register configured to store activation information of the plurality of signal processing engines, the memory controller being configured such that the activation information is decided according to a determination result of the CPU,
wherein the memory controller is configured such that, if the determined operating condition of the memory controller is a high performance operating condition, the CPU decides a value of the register such that the plurality of signal processing engines are all activated.

8. The memory controller of claim 7, wherein the encoding scheduler is configured to generate the first packet data such that, when a signal processing engine from among the plurality of signal processing engines is performing an encoding operation, data is distributed to remaining signal processing engines from among activated ones of the plurality of signal processing engines other than the signal processing engine performing the encoding operation.

9. The memory controller of claim 7, wherein the decoding scheduler is configured to generate the second packet data such that, when a signal processing engine from among the plurality of signal processing engines is performing a decoding operation, data is distributed to remaining signal processing engines from among activated ones of the plurality of signal processing engines other than the signal processing engine performing the decoding operation.

10. The memory controller of claim 7, wherein the decoding scheduler is configured to generate the second packet data such that data transferred via one of the plurality of channels is distributed to activated ones of the plurality of signal processing engines.

11. The memory controller of claim 7, wherein the encoding scheduler is configured to generate the first packet data such that data transferred via one of the plurality of FIFOs is distributed to activated ones of the plurality of signal processing engines.

12. The memory controller of claim 7, wherein the plurality of signal processing engines are error correction code engines, compression engines, encryption engines, or hash key engines.

13. The memory controller of claim 1, wherein a total number of the plurality of signal processing engines is equal to or less than a total number of the plurality of channels.

14. The memory controller of claim 1, wherein each signal processing engine from among the plurality of signal processing engines is configured to operate according to a same error correction code algorithm.

15. A memory system comprising:
a storage medium; and
a memory controller connected with the storage medium via a plurality of channels,
wherein the memory controller includes,
a plurality of signal processing engines,
a plurality of first in first out buffers (FIFO)s configured to temporarily store data to be transferred to the plurality of channels,
an encoding/decoding block, and
a first bus matrix configured to sequentially transfer first packet data, which includes data output from the plurality of FIFOs respectively, to at least one activated signal processing engine, from among the plurality of signal processing engines, based on control information included in the first packet data,
the encoding/decoding block being configured to connect the plurality of signal processing engines to the plurality of channels respectively, when the memory system performs a memory operation that uses the plurality of channels.

16. The memory system of claim 15, wherein the memory controller comprises:
a CPU configured to generate a determination result by determining an operating condition of the memory controller;
a register configured to store activation information of the plurality of signal processing engines, the memory controller being configured to decide the activation information according to the determination result of the CPU; and
a decoding scheduler configured to control a data path such that the at least one activated signal processing engine is connected to the plurality of channels, respectively, the at least one activated signal processing engine being activated according to the activation information of the register,
the decoding scheduler being configured to control a data path such that data of the plurality of FIFOs is transferred to the at least one activated signal processing engine.

17. The memory system of claim 16, further comprising:
an encoding scheduler, the encoding scheduler including,
a first packet generator configured to generate the first packet data by adding the control information to data output from each of the plurality of FIFOs based on a state of the at least one activated signal processing engine; and
the first bus matrix.

18. The memory system of claim 17, wherein the decoding scheduler comprises:
a second packet generator configured to generate second packet data by adding control information to data output from each of the plurality of channels based on a state of the at least one activated signal processing engine; and a second bus matrix configured to sequentially transfer the second packet data, which corresponds respectively to the plurality of channels, to the at least one activated signal processing engine based on the control information included in the second packet data.

19. The memory system of claim 18, wherein the decoding scheduler is configured to generate packet data such that data transferred via one of the plurality of channels is distributed to activated ones of the plurality of signal processing engines.

20. The memory system of claim 18, wherein each signal processing engine from among the plurality of signal processing engines is an error correction code engine, compression engine, encryption engine, or hash key engine.

21. The memory system of claim 15, wherein the encoding/decoding block comprises:
a plurality of second signal processing engines, and the memory system is configured such that the plurality of second signal processing engines is activated to perform encoding and decoding operations when a use of the plurality of signal processing engines is stopped, activation of the plurality of second signal processing engines being decided according to an error rate.

22. A bandwidth controlling method of a memory controller which is connected with a storage medium via a plurality of channels, comprising:
receiving an input signal; and
processing the input signal with the memory controller using a signal processing level, the signal processing level of the input signal being determined according to an operating condition of the memory controller,
the memory controller including a plurality of signal processing engines, the plurality of signal processing engines including one or more activated signal processing engines and one or more signal processing engines that are not activated such that a total number of the one or more activated signal processing engines corresponds to the signal processing level, the processing of the input signal including,
generating packet data by adding control information to the input signal, the control information being based on states of the plurality of signal processing engines,
transferring the packet data to the one or more activated signal processing engines based on the control information included in the packet data, and
processing the packet data using the one or more activated signal processing engines,
each signal processing engine from among the plurality of signal processing engines being an error correction code engine, a compression engine, an encryption engine, or a hash key engine.

23. The bandwidth controlling method of claim 22, further comprising:
controlling a data path such that the one or more activated signal processing engines are connected to the plurality of channels, respectively.

24. The bandwidth controlling method of claim 22, further comprising:
controlling a data path such that the input signal is transferred to the one or more activated signal processing engines.

25. The bandwidth controlling method of claim 24, wherein the controlling a data path such that the processed signal is transferred to the one or more activated signal processing engines comprises:
generating packet data by adding control information to data output from the plurality of channels based on a state of the one or more activated signal processing engines; and
transferring signals corresponding to the plurality of channels to the one or more activated signal processing engines based on the control information included in the packet data.

26. A memory controller which is connected with a storage medium via a plurality of channels, comprising:
a signal processing block including a plurality of coding engines, the plurality of coding engines being configured to perform a signal processing operation;
a scheduler configured to cause a first plurality of data units to be sent to a selected number of the plurality of coding engines via the plurality of channels, the memory controller being configured to determine the selected number based on an operation mode of the memory controller;
a plurality of first in first out buffers (FIFO)s configured to temporarily store data to be transferred to the plurality of channels; and
a first bus matrix configured to sequentially transfer first packet data, which includes data output from the plurality of FIFOs respectively, to the selected number of the plurality of coding engines based on control information included in the first packet data,
the signal processing operation including one of a decoding operation and an encoding operation.

27. The memory controller of claim 26, wherein the scheduler is configured such that
for a first operation mode of the memory controller, the scheduler determines a first number as the selected number, and
for a second operation mode of the memory controller, the scheduler determines a second number as the selected number,
the first number being different from second number.

* * * * *